US007678246B2

(12) United States Patent
Omasa

(10) Patent No.: US 7,678,246 B2
(45) Date of Patent: Mar. 16, 2010

(54) VIBRATINGLY STIRRING APPARATUS, AND DEVICE AND METHOD FOR PROCESSING USING THE STIRRING APPARATUS

(75) Inventor: Ryushin Omasa, Fujisawa (JP)

(73) Assignee: Japan Techno Co., Ltd., Tokyo (JP)

( * ) Notice: Subject to any disclaimer, the term of this patent is extended or adjusted under 35 U.S.C. 154(b) by 288 days.

(21) Appl. No.: 11/970,671

(22) Filed: Jan. 8, 2008

(65) Prior Publication Data

US 2008/0117711 A1 May 22, 2008

Related U.S. Application Data

(62) Division of application No. 10/481,198, filed as application No. PCT/JP02/06217 on Jun. 21, 2002, now Pat. No. 7,338,586.

(30) Foreign Application Priority Data

Jun. 25, 2001 (JP) ............................ 2001-192050
Aug. 13, 2001 (JP) ............................ 2001-245611

(51) Int. Cl.
*C02F 1/467* (2006.01)
*C25B 9/00* (2006.01)

(52) U.S. Cl. ...................................... 204/273; 205/755

(58) Field of Classification Search ....................... None
See application file for complete search history.

(56) References Cited

U.S. PATENT DOCUMENTS 3,024,174 A 3/1962 Stetson ........................ 204/39

(Continued)

FOREIGN PATENT DOCUMENTS

EP 0 915 182 A1 5/1999

(Continued)

OTHER PUBLICATIONS

Lowenheim, Frederick, "Electroplating", Jan. 1979, pub. by McGraw-Hill Book Company, pp. 139.*

(Continued)

*Primary Examiner*—Harry D Wilkins, III
(74) *Attorney, Agent, or Firm*—Frommer Lawrence & Haug LLP; Ronald R. Santucci

(57) ABSTRACT

An insulated vibration-stirring apparatus comprising: a vibration generating means containing a vibration motor and a vibrating member attached to that motor, and a vibrating rod attached by an installation piece to allow vibration lined with the vibration generating means, and vibrating vanes installed on this vibrating rod. An electrical insulation area made from hard rubber is installed on a section nearer to the installation section to the installation piece than the section where the vibrating vanes are mounted on the vibrating rod. An electrical line is connected to the lower section of the vibrating rod on the electrical insulation area side where the vibrating vanes are installed. This electrical line conducts power to the vibrating vanes by way of the lower section of the vibrating rod. A power supply applies a voltage across the lower section of the vibrating rod and vibrating vanes and treatment tank by way of the electrical lines, and while applying power to the processing liquid within the treatment tank, the insulation vibration stirring apparatus vibrates and stirs the processing liquid.

9 Claims, 27 Drawing Sheets

U.S. PATENT DOCUMENTS

| | | | | | |
|---|---|---|---|---|---|
| 3,115,139 | A * | 12/1963 | Schneider | 606/235 |
| 3,861,653 | A * | 1/1975 | Becheiraz | 366/119 |
| 4,049,530 | A | 9/1977 | Tokumoto et al. | 204/273 |
| 5,375,926 | A * | 12/1994 | Omasa | 366/118 |
| 5,534,048 | A * | 7/1996 | Dailey et al. | 106/1.22 |
| 5,730,856 | A | 3/1998 | Omasa | 205/742 |
| 6,322,240 | B1 * | 11/2001 | Omasa | 366/118 |
| 2001/0053332 | A1 * | 12/2001 | Omasa | 422/22 |
| 2003/0226767 | A1 * | 12/2003 | Omasa | 205/755 |
| 2004/0094408 | A1 * | 5/2004 | Omasa | 204/273 |
| 2004/0195090 | A1 * | 10/2004 | Omasa | 204/273 |
| 2005/0011765 | A1 * | 1/2005 | Omasa | 204/633 |
| 2007/0003803 | A1 * | 1/2007 | Omasa et al. | 429/21 |

FOREIGN PATENT DOCUMENTS

| | | | |
|---|---|---|---|
| EP | 1 050 336 | A1 | 11/2000 |
| GB | 265047 | | 2/1927 |
| JP | 3-275130 | A | 12/1991 |
| JP | 6-220697 | A | 8/1994 |
| JP | 6-280035 | A | 10/1994 |
| JP | 6-287799 | A | 10/1994 |
| JP | 6-304461 | A | 11/1994 |
| JP | 6-312124 | A | 11/1994 |
| JP | 6-330395 | A | 11/1994 |
| JP | 7-54192 | A | 2/1995 |
| JP | 7-126896 | A | 5/1995 |
| JP | 8-173785 | A | 7/1996 |
| JP | 8-199400 | A | 8/1996 |
| JP | 8-281272 | A | 10/1996 |
| JP | 9-87893 | A | 3/1997 |
| JP | 9-125394 | A | 5/1997 |
| JP | 10-43569 | A | 2/1998 |
| JP | 10-309453 | A | 11/1998 |
| JP | 11-189880 | A | 7/1999 |
| JP | 11-253782 | A | 9/1999 |
| JP | 2001-271189 | A | 10/2001 |
| JP | 2002-102323 | A | 4/2002 |
| JP | 2002-146597 | A | 5/2002 |
| JP | 08281272 | | 10/2006 |

OTHER PUBLICATIONS

Machine translation of JP 08-199400 A.*
Machine translation of JP 09-125294 A.*

* cited by examiner

VIBRATINGLY STIRRING APPARATUS, AND DEVICE AND METHOD FOR PROCESSING USING THE STIRRING APPARATUS

This is a division of U.S. patent application Ser. No. 10/481,198 filed Dec. 18, 2003 entitled "Vibratingly Stirring Apparatus, and Device and Method for Processing Using the Stirring Apparatus" now U.S. Pat. No. 7,338,586, which is a 371 of PCT/JP02/06217 filed on Jun. 21, 2002, published on Jan. 3, 2003 under publication number WO 03/000395 A1 and claims priority benefits of Japanese Patent Application No. 2001-192050 filed Jun. 25, 2001 and Japanese Patent Application No. 2001-245611 filed Aug. 13, 2001, the disclosures of which are hereby incorporated by reference.

BACKGROUND OF THE INVENTION

1. Field of the Invention

The present invention relates to a novel vibration stirring apparatus incorporating functions of both an electrode and a cooling means, and to a device and method for processing liquids or products utilizing a vibration stirring apparatus. The present invention is for example ideal for surface treatment of products of all types by electrolysis.

2. Description of Related Art

In vibration stirring devices, vibrating vanes are mounted on a vibrating rod and the vibrating rod then oscillated to make the vanes move in a fluid such as a liquid and in this way create fluid motion. This kind of vibration stirring apparatus is disclosed in the following patent documents in Japanese patent application for inventions by the present inventors.

JP-A No. 275130/1991 (Patent No. 1941498)

JP-A No. 220697/1994 (Patent No. 2707530)

JP-A No. 312124/1994 (Patent No. 2762388)

JP-A No. 281272/1996 (Patent No. 2767771)

JP-A No. 173785/1996 (Patent No. 2852878)

JP-A No. 126896/1995 (Patent No. 2911350)

JP-A No. 189880/1999 (Patent No. 2988624)

JP-A No. 54192/1995 (Patent No. 2989440)

JP-A No. 33095/1994 (Patent No. 2992177)

JP-A No. 287799/1994 (Patent No. 3035114)

JP-A No. 280035/1994 (Patent No. 3244334)

JP-A No. 304461/1994 (Patent No. 3142417)

JP-A No. 43569/1998

JP-A No. 309453/1998

JP-A No. 253782/1999

Vibration stirring apparatus are used in different types of processes. The basic function of these vibration stirring apparatus is to generate a vibrating movement in the fluid. In recent years however, functions other than this basic function are being added to the vibration stirring apparatus.

An electrolytic polishing method for aluminum products was disclosed in the invention of JP-A No. 199400/1996. This method was characterized by utilizing for example, titanium alloy electrodes or vanes made of titanium capable of generating fluid flow accompanying the vibration of electrolytic fluid by causing vertical (up/down) vibration. This invention however did not disclose whether the vibrating rod was utilized as electrodes or the vanes were utilized as electrodes. Further there was virtually no specific description of how electrical insulation was maintained between the sections utilized as electrodes and the other sections. An examination of the overall description indicates that the vibrating rod might be utilized as the electrode. However there are no descriptions or suggestions whatsoever of how the vibration motor is insulated when electrical current flows in the vibrating rod and how safety was maintained.

A method was disclosed in JP-A No. 125294/1997 for a surface treatment device comprised of a vibration stirring apparatus utilizing a support rod as the electrode. However in this invention also there were no descriptions or suggestions whatsoever of how the overall vibration stirring apparatus and electrodes were electrically insulated. Further, in this disclosure of technology of the known art, the electrical current density was 3 $mA/cm^2$ which is approximately the same electrical current density as ordinary plating (or galvanizing).

When the vibration stirring apparatus is agitating a high or low temperature fluid, heat is propagated by the vibration generating means such as the vibration motor, and the fluid by way of the vibrating rod. This fluid might subject the vibration generating means to heat expansion and eventually cause a drop in performance.

SUMMARY OF THE INVENTION

In view of these problems, it is an object of the present invention is to expand the applicable range of the vibration stirring apparatus by adding functions different from its basic function, and to further improve performance unique to that applicable range.

One applicable range is surface treatment. This surface treatment (processing) encompasses the following technical problems.

In current technical fields for example for anodic oxidation, plating, and electro-deposition utilizing electrolysis, the electrical current density varies somewhat according to the type of processing fluid (electrolyte), and the purpose or other equipment but is usually 2 to 3 $A/dm^2$. The crystallizing speed of the electrical plating is proportional to the electrical current density. A means is known in the related art for high speed plating by utilizing a powerful pump to spray electrolytic fluid on the item for processing (treating) and therefore increase the electrical current density. Even with this method however, the electrical current density is limited to only about 5 to 6 $A/dm^2$. Also, irregularities occur in the product film thickness so this method is not practical to use.

In regions with low electrical current density, the current flow is highly efficient at nearly 100 percent. But when the electrical current density exceeds a certain point, the electrical current efficiency suddenly drops and hydrogen gas generated from the plating surface can be observed. When the electrical current density increases even further, the pH rises in the electrode boundary, unwanted secondary reactions occur in the electrode boundary, bubbles are generated, electrical current stops flowing and the (desired) reaction progresses no further.

The electrical current density therefore has an upper limit or in other words a threshold current density. Trying to raise the electrical current density further than this limit to speed up the processing by shortening the gap (distance) between electrodes, causes burning and scorching on the product and a flat, smooth and uniform electrodeposition surface cannot be obtained.

In the field of electroforming, and even in the so-called high-speed electroforming plating method, this current density threshold is approximately 30 A/$cm^2$. Irregularities of approximately ±8 to 10 micrometers also occur in the film thickness.

In all of these surface treatment methods, the stirring (or agitating) apparatus is installed based on the concept that stirring for uniformity in the processing fluid can be achieved by not closely approaching the article (liquid and article) (treating). Use of vibration stirring apparatus also follows this same approach and so there is no concept of using small gaps (distances) between the stirring apparatus and article (liquid and article), or between the stirring apparatus and electrodes. In other words, the article (liquid and article) and vibration stirring apparatus are not installed facing each other. Further, one end of the anode is installed at a position very far away from the vibration stirring apparatus. The installation of the vibration stirring apparatus is therefore only concerned with uniformity (consistency) in the agitation (stirring) of the processing fluid.

An electrodeposition coating device and electrodeposition coating method utilizing a vibration stirring apparatus are disclosed in JP-A No. 87893/1997. According to the description of the invention, the items for coating pass continuously along a long and narrow electrodeposition coating tank so the vibration stirring apparatus is installed near the tank inlet area. The next area is an electrodeposition coating area formed from side electrode plates and diaphragm enclosing these electrodes. Even in this kind of electrodeposition coating, there is no concept in the conventional art for installing the stirring apparatus as close as possible to the electrodes or items for processing.

An electrodeposition coating device and electrodeposition coating method utilizing a vibration stirring apparatus are also disclosed in JP-A No. 146597/2002. Here also, there is no concept for installing the vibration stirring apparatus as near as possible to the electrodes and objects for processing.

A further object of the present invention is to provide a high-speed surface treatment apparatus and high-speed surface treatment method for drastically increasing the conventional electrical current density threshold by reducing the gap between the electrode and object to be processed, and also eliminating the occurrence of irregularities when forming the film thickness, without causing scorching and burns and further without causing bubbles in the electrode.

To achieve the above objects of the invention, an insulated type vibration stirring apparatus is proposed comprising:

a vibration generating means and, at least one vibrating rod for vibrating while linked to the vibration generating means, and at least one vibrating vane installed on the vibrating rod, and an electrical or heat-insulation area installed on a link section linking the vibrating rod with the vibrating generating means, or on a section nearer the linking (connection) than the section where the vibrating vane is installed on the vibrating rod.

In the embodiment of the present invention, that insulation area is a material comprised mainly of (synthetic resin) plastic and/or rubber.

In the embodiment of the present invention, the insulation area is an electrical insulation area. An electrical line connects to the lower section of the vibrating rod on the side of the electrical insulation area where the vibrating vanes are installed. In the embodiment of the present invention, the insulated type vibration stirring apparatus contains a power supply connected to that electrical line.

In the embodiment of the present invention, the electrode member is electrically connected to that electrical line installed on that vibrating rod on the side of the electrical insulation area where the vibration vanes is installed. In the embodiment of the present invention, at least one vane of the vibrating vanes functions as an electrode member.

In the embodiment of the present invention, auxiliary vibrating vanes-for-electrode electrically connected to the electrical line by way of the vibrating rod are installed on the vibrating rod on the side of the electrical insulation area where the vibrating vanes are installed. In the embodiment of the present invention, electrode support vanes are installed on the vibrating rod so that the electrode support vane positions alternate with the vibrating vane positions. In the embodiment of the present invention, the surface area of the electrode support vanes is larger than the surface area of the vibrating vanes, and the tips of the electrode support vanes protrude farther than the tips of the vibrating vanes.

In the embodiment of the present invention, a first electrode member and a second electrode member forming a pair of electrode members are respectively connected to multiple vibrating rods, and the first electrode member is electrically connected with the electrical line by way of at least one of the multiple vibrating rods, and the second electrode member is electrically connected with the electrical line by way of at least one other of the multiple vibrating rods.

In the embodiment of the present invention, the gap between the first electrode member and the second electrode member is maintained at 20 to 400 millimeters. In the embodiment of the present invention, vibrating vanes are installed on multiple vibrating rods, and at least a portion of the vibrating vanes function as the first electrode member or as the second electrode member.

In the embodiment of the present invention, each of the multiple vibrating vanes are installed on the multiple vibrating rods, and a portion of the multiple vibrating vanes function as the first electrode member and, another portion of the multiple vibrating vanes function as the second electrode member. In the embodiment of the present invention, electrode support vanes are installed on the multiple vibrating rods on the side of the electrical insulation area where the vibrating vanes are installed, and the electrode support vanes function as a first electrode member or a second electrode member.

In the embodiment of the present invention, multiple electrode support vanes are installed on the multiple vibrating rods on the side of the electrical insulation area where the vibrating vanes are installed, and a portion of the electrode support vanes function as the first electrode member and, another portion of the multiple electrode support vanes function as the second electrode member.

In the embodiment of the present invention, the insulation region is a heat insulation region, and a heat exchange medium injector section and a heat exchange extraction section are installed on the side of the heat insulation area where the vibrating vanes are installed on the vibrating rod.

To achieve the above objects, the present invention provides, a liquid treatment apparatus for an insulated vibration-stirring apparatus comprising a vibration generating means and, at least one vibrating rod for vibrating while linked to the vibration generating means, and at least one vibrating vane installed on the vibrating rod, and an electrical insulation area installed on a link section linking the vibrating rod with the vibrating generating means, or installed nearer the lining (connection) than where the vibrating vane is installed on the vibrating rod;

and further comprising a treatment tank for holding the processing liquid, and a first electrode member and a second electrode member forming a pair, and a power supply for applying direct current, alternating current or pulsed voltages across the first electrode member and the second electrode member.

In the embodiment of the present invention, a gap of 20 to 400 millimeters is maintained between the first electrode member and the second electrode member.

In the embodiment of the present invention, an electrical line is electrically connected to the side of the electrical insulation area where the vibrating vanes are installed on the vibrating rod, and the first electrode member or the second electrode member are installed on the side of the electrical insulation area where the vibrating vanes are installed on the vibrating rod, and further are electrically connected to the power supply by way of the vibrating rod and the electrical line.

In the embodiment of the present invention, the vibrating vanes electrically connected with the power supply by way of the vibrating rod and the electrical line are installed on the side of the electrical insulation area where the vibrating vanes are mounted on the vibrating rod, and function as a first electrode member or as a second electrode member. In the embodiment of the present invention, the electrode support vanes are electrically connected with the power supply by way of the vibrating rod and the electrical line, and function as the first electrode member or as the second electrode member. In the embodiment of the present invention the liquid treatment apparatus comprises two insulated vibration-stirring apparatus; and the power supply applies a voltage across a the first electrode member of one insulated vibration-stirring apparatus, and a second electrode member of the other insulated vibration-stirring apparatus.

In the embodiment of the present invention (liquid treatment apparatus), vibrating vanes are installed on the multiple vibrating rods, and each of the first electrode members and the second electrode members are installed on the multiple vibrating rods, and the first electrode members are electrically connected with the power supply by way of at least one of the multiple vibrating rods and the electrical line connected to the vibrating rods, and the second electrode member is electrically connected with the power supply by way of at least one of the other the multiple vibrating rods and by the electrical line connected to the vibrating rods.

In the embodiment of the present invention (liquid treatment apparatus), at least one of the multiple vibrating rods and the vibrating vanes electrically connected with the power supply by way of an electrical line connecting to the vibrating rod functions as the first electrode member, and/or at least one of the other multiple vibrating rods and the vibrating vanes electrically connected with the power supply by way of an electrical line connecting to the vibrating rod functions as the second electrode member.

In the embodiment of the present invention (liquid treatment apparatus), electrode support vanes are installed on the multiple vibrating rods on the side of the electrical insulation area where the vibrating vanes are installed, and at least one of the multiple vibrating rods and the electrode support vanes electrically connected with the power supply by way of an electrical line, functions as the first electrode member, and/or at least one of the other multiple vibrating rods and the electrode support vanes electrically connected with the power supply by way of an electrical line, functions as the second electrode member.

In the embodiment of the present invention (liquid treatment apparatus), electrode support vanes are installed on the multiple vibrating rods on the side of the electrical insulation area where the vibrating vanes are installed, and at least one of the multiple vibrating rods and the electrode support vanes electrically connected with the power supply by way of an electrical line, functions as the first electrode member, and/or at least one of the other multiple vibrating rods and the electrode support vanes electrically connected with the power supply by way of an electrical line, functions as the second electrode member.

To achieve the above objects, the present invention provides a liquid processing method, wherein a processing liquid is filled into the treatment tank of a liquid treatment apparatus, the vibrating vanes are immersed in the processing liquid, and the vibrating vanes are made to vibrate while power is conducted across the first electrode member and the second electrode member by way of the processing liquid.

In the embodiment of the present invention (liquid treatment apparatus), a gap of 20 to 400 millimeters is maintained between the first electrode member and the second electrode member. Also in the embodiment of the present invention, the vibration generating means vibrates at a frequency of 10 to 500 Hz; the vibrating vanes have an amplitude of vibration of 0.1 to 30 millimeters and further are made to vibrate at a frequency of 200 to 12,000 times per minute.

In the embodiment of the present invention, members on the vibrating vane side of the electrical insulation region on the vibrating rod in the vibration-stirring apparatus are utilized as at least one of either the first electrode member or the second electrode member. In the present embodiment, vibrating vanes are utilized as at least one of either the first electrode member or the second electrode member.

In the embodiment of the present invention, electrode support vanes installed on the vibrating vane side of the electrical insulation region on the vibrating rod in the vibration-stirring apparatus are utilized as at least one of either the first electrode member or the second electrode member.

The embodiment of the present invention, uses two insulated vibration-stirring apparatus, and a member installed on the vibrating rod of the first vibration-stirring apparatus is utilized as the first electrode member, and a member installed on another vibrating rod of the second vibration-stirring apparatus is utilized as the first electrode member.

In the embodiment of the present invention, vibrating vanes are installed on multiple the vibrating rods in the vibration-stirring apparatus, and members installed on the vibrating vane side of the electrical insulation region on the multiple vibrating rods in the vibration-stirring apparatus are utilized as at least one of either the first electrode member or the second electrode member, and at least one among the multiple vibrating rods functioning as the first electrode member are electrically connected to the power supply, and at least one among the other multiple vibrating rods functioning as the second electrode member are electrically connected to the power supply. In the embodiment of the invention, at least one of either the first electrode member of the second electrode member are utilized as the vibrating vane.

To achieve the above objects, the present invention provides: a surface treatment apparatus comprising:

a treatment tank;

a vibration-stirring apparatus (A) containing; a vibration generating means, at least one vibrating rod for vibrating while linked to the vibration generating means, and at least one vibrating vane installed on the vibrating rod;

an electrode member (B); and a holder for maintaining a product for processing (C) to allow electrical conduction, wherein the vibrating vanes, the electrode member (B) and the product for processing (C) are installed within the treatment tank to maintain a respective gap of 20 to 400 millimeters.

In the present invention, the holder for maintaining the product for processing (C) to allow electrical conduction, is not limited to a holder that forms a conductive path to the product for processing (C) from a power supply connected electrically the product for processing (C); and the product for processing (C) maintained by the holder may connect to a power supply by way of a conducting path installed separately from the holder.

In the embodiment of the present invention, the electrode member (B) and the product for processing (C) are installed to face the tip of the vibrating vane. In the embodiment of the present invention, the electrode member (B) is made from a porous plate piece, a web-shaped piece, a basket-shaped piece or a rod-shaped piece.

To achieve the above objects, the present invention provides: a surface treatment apparatus comprising:

a treatment tank;

a vibration-stirring apparatus (A') containing; a vibration generating means, at least one vibrating rod for vibrating while linked to the vibration generating means, and at least one vibrating vane installed on the vibrating rod, and an electrical insulation area is installed at a link section linking the vibrating rod and the vibration generating means, or on a section nearer the linking (connection) than the section where the vibrating vanes are mounted on the vibrating rod;

a holder for maintaining a product for processing (C) to allow electrical conduction, wherein the vibrating vanes, and the product for processing (C) are installed within the treatment tank to maintain a respective gap of 20 to 400 millimeters.

In the embodiment of the present invention (surface treatment apparatus), the product for processing (C) is installed to face the tip of the vibrating vane. An embodiment of the present invention further comprising an electrode member (B), and the electrode member (B) is installed within the treatment tank to maintain a respective gap of 20 to 400 millimeters with the vibrating vane and the product for processing (C). In the embodiment of the present invention, the electrode member (B) is made from a porous plate piece, a web-shaped piece, a basket-shaped piece or a rod-shaped piece.

In the embodiment of the present invention, the insulation area of the insulated vibration-stirring apparatus (A') is a material comprised mainly of plastic and/or rubber. In the embodiment of the present invention, on the insulated vibration-stirring apparatus (A'), an electrical line is connected to the vibrating rod on the side of the electrical insulation area where the vibrating vanes are installed.

In the embodiment of the present invention, electrode support vanes are installed on the vibrating rod on the side of the electrical insulation area where the vibrating vanes are installed. In the embodiment of the present invention, electrode support vanes are installed on the vibrating rod so that the electrode support vane positions alternate with the vibrating rod positions. In the present embodiment, the surface area of the electrode support vanes is larger than the surface area of the vibrating vanes, and the tips of the electrode support vanes protrude farther than the tips the vibrating vanes.

To achieve the above objects, the present invention provides: a surface treatment method, wherein a processing liquid is filled into the treatment tank of a surface treatment apparatus, the vibrating vanes, the electrode member (B) and the product for processing (C) are immersed in the processing liquid, and the electrode member (B) is set as one electrode, and the product for processing (C) is set as the other electrode, and the vibrating vanes are made to vibrate while power is conducted across one electrode member and other the electrode member by way of the processing liquid.

In the embodiment of the present invention, the surface treatment method is electrodeposition, anodic oxidation, electropolishing, electro-degreasing, plating or electroform plating or is preprocess or postprocess using these methods. In the present embodiment, the electrodeposition, anodic oxidation, electro-degreasing, electropolishing, plating, preprocessing or postprocessing for these method, or preprocessing or postprocessing for electroform plating is performed at an electrical current density of 10 A/dm$^2$ or more. In the present embodiment, the electroform plating is performed at an electrical current density of 20 A/dm$^2$ or more. In the present embodiment, the vibration generating means vibrates at a frequency of 10 to 500 Hz; the vibrating vanes have an amplitude of vibration of 0.1 to 30 millimeters and further are made to vibrate at a frequency of 200 to 12,000 times per minute.

To achieve the above objects, the present invention provides: a surface treatment method wherein a processing liquid is filled into the treatment tank of a surface treatment apparatus, the vibrating vanes and the product for processing (C) are immersed in the processing liquid, and the vibrating rod and the vibrating vane electrically connected to the vibrating rod are set as one electrode, and further, the product for processing (C) is set as the other electrode; and the vibrating vanes are made to vibrate while power is conducted across one electrode and other the electrode by way of the processing liquid; and product for processing (C) is surface treated.

In the embodiment of the present invention, the electrode member (B) is installed within the treatment tank to maintain a respective gap of 20 to 400 millimeters with the vibrating vane and the product for processing (C); and the electrode member (B) is utilized as the other electrode.

In the present invention, the structure of the insulated type vibration stirring apparatus (A') is included among the structures of the vibration stirring apparatus (A).

In the present invention, the arrangement sequence for the vibration stirring apparatus (A), the insulated type vibration stirring apparatus (A'), the electrode member (B) and the product for processing (C) may for example include the following.

(A)-(B)-(C)

(B)-(A)-(C)

(A)-(B)-(C)-(B)-(A)

(B)-(A)-(C)-(A)-B)

(A)-(B)-(C)-(A)-(B)

(A')-(B)-(C)

(B)-(A')-(C)

(A')-(B)-(C)-(B)-(A')

(B)-(A')-(C)-(A)-(B)

(A)-(C)

(A')-(C)-(A)

(A')-(C)-(B)-(A')

(A')-(C)-(A')-(B)

In the related art, there was no concept of installing the stirring apparatus near the electrodes and the product for processing. The reason there was no such concept was that bringing the stirring apparatus too dose to the electrodes and the product for processing created "irregularities" in the liquid to be stirred within the treatment tank so that the uniformity of the product processing might deteriorate. This concept was carried over to the vibration stirring apparatus.

However, the concept of the present inventors is contrary to the rules used up until now for stirring or agitation. In this novel concept, the vibrating vane or electrode support vanes in the vibration stirring apparatus are installed facing and in proximity to the product for processing (C) and the electrode member (B). When a liquid with a strong flow motion comes in contact with the opposing surfaces of the product for processing (C) and the electrode member (B), the surprising result was that no electrical short occurred between the two components within a distance where electrical shorts were predicted to occur in stirring in the conventional art. In other words, it was revealed that at a distance considered as approximately 500 millimeters at most up until now, the electrical current density could be increased while reducing the distance to 400 millimeters, preferably 300 millimeters, even more preferably 200 millimeters and most preferably approximately 180 millimeters without causing an electrical short to occur. However the distance between the vibrating vane or electrode support vane, and product for processing (C) and electrode member (B) is preferably 20 millimeters or more. If this distance is reduced to less than 20 millimeters then electrical shorts might occur.

The distance at which the electrode member (B) and product for processing (C) are installed to face each other is preferably 200 millimeters or less. This distance is more preferably 180 millimeters or less, and a distance of 100 millimeters or less is particularly preferable. However this distance should not exceed 20 millimeters.

In the present invention, in vibration stirring apparatus (A) or insulated type vibration stirring apparatus (A'), the distance between the vibrating vane or electrode support vane, and the product for processing (C) or electrode member (B) here signifies the maximum distance between the tip of vibrating vane or electrode support vane {protruding towards (C) or (B)} and the product for processing (C) and electrode member (B) in the vibration stirring apparatus (A) or insulated vibration stirring apparatus (A').

In the present invention, it is extremely preferable that the product for processing is installed to face the vibrating vane or electrode support vane of the vibration stirring apparatus (A) or insulated vibration stirring apparatus (A). Here, "to face" signifies an installation position where the vibration flow motion generated by the vibrating vanes of vibration stirring apparatus (A) or insulated vibration stirring apparatus (A') is conveyed directly to the surface for processing (In other words, the vibrating vane tip faces towards the surface for processing on the product (C)). When the product for processing for example has a flat processing surface, this signifies that that the surface to be processed is installed to face the tip of the vibrating vane or electrode support vane. When the product for processing has a surface greater than more than one vibration stirring apparatus, then multiple vibration stirring apparatus may be arrayed at position facing that surface for processing. When the product for processing is a small object, then that small object may be installed so it is entirely faced by the vibrating vanes or electrode support vanes of vibration stirring apparatus (A) or insulated vibration stirring apparatus (A'). The same technique may be utilized when the small object is inserted into a barrel for processing.

In the present invention, the vibrating vanes mounted on the vibrating rod have an amplitude of vibration in the processing fluid or processing fluid within the treatment tank of 0.1 to 30 millimeters, and preferably 0.1 to 20 millimeters, and more preferably 0.5 to 15 millimeters, and most preferably 2 to 15 millimeters. The number of vibration (frequency) is 200 to 12,000 times per minute, and preferably is 200 to 5,000 times per minute and most preferably is 200 to 1,000 times per minute.

The electrode member may for example have a porous plate shape, a metallic net shape, a basket shape (including metallic pieces or metallic clusters within the basket) or a rod-shaped piece. The porous plate shape may for example be in the shape of a metallic net or mesh. The electrode member is preferably in a shape that avoids as much as possible impeding the flow motion of the liquid.

The present invention can perform surface treatment processing such as electrodeposition, anodic oxidation, plating, electro-degreasing, electropolishing, and electro-cast plating. The product for processing is an base object for coating/painting when using electrodeposition, a base object for anode oxidizing when using anodic oxidation, a base object for plating when using plating, a base object for degreasing when using electro-degreasing, a base object for polishing when using electropolishing, and a base object for electroform plating when using electroforming.

The electrodeposition treatment (or processing) is performed the same as in the related art according to the process of degreasing/washing/surface adjustment/film forming/washing/hot washing (drying away moisture)/electrodeposition/primary washing/secondary washing/airblow/ and tempering (annealing). The present invention is achieved through the electrodeposition process. Electrodeposition may consist of anion electrodeposition or cation electrodeposition. The present invention applies to either type of electrodeposition and renders the effect of greatly reducing the required time and also improving the uniformity of the paint coating film.

The anodic oxidation treatment process may use lead, carbon or a metal (for example, aluminum if the process is anodic oxidizing of aluminum) identical to the anodic oxidized item as the cathode plate (electrode member) the same as in the related art. The vibration stirring apparatus of present invention use the electrode members in close proximity so preferably a porous type (Items arranged in a rod shape may also be used.) having holes formed at appropriate gaps or a net shape may be utilized as the cathode (negative electrode) plate. Pure titanium or titanium alloy is preferably utilized as the cathode plate in view of its durability and resistance to corrosion. The product for processing may be aluminum, or an alloy of aluminum (for example, Al—Si, Al—Mg, Al—Mg—Si, Al—Zn, etc.) magnesium or an alloy of magnesium, tantalum or an alloy of tantalum, titanium or alloy of titanium.

There are no particular restrictions on the processing fluid (processing liquid) utilized in the anodic oxidizing. However the processing liquid is preferably ammonium sulfate, alkali sulfate or an electrolytic fluid containing a combination of these liquids. More specifically, the sulfuric acid is 0.3 to 5.0 moles per liter, the ammonium sulfate is 0.16 to 4.0 moles per liter and/or the alkali sulfate is 0.1 to 2.0 moles per liter.

The electrical plating may utilize metal objects or plastics subjected to activizing treatment as the product for processing.

The crystallizing speed during electrical plating is proportional to the electrical current density so a larger electrical current density is linked to a higher plating speed. The plating method of the related art had a limited electrical current density of about 2 to 4 $A/dm^2$ at most. If the electrical current density is increased higher than this, the electrical current efficiency suddenly drops, hydrogen gas is emitted from the surface of the processed product in conspicuous amounts, the pH on the electrode boundary rises, and hydroxides settle into the electrode surface. Countermeasures proposed to eliminate these problems included forced flow feed of plating fluid (parallel flow method, jet flow method, spray flow method, etc.) and the vibrating barrel method for making solid particles (for example, polishing particles and glass spheres) strike the plating surface. However none of these methods proved satisfactory.

However when the present invention is used with this kind of plating, the emission of hydrogen gas from the electrode member can be suppressed even if the electrical current density is increased. For example, even at a high electrical current density of 10 to 30 A/dm$^2$, the electric current efficiency does not drop and high efficiency plating can be performed. In particular, when using the vibrations apparatus (A), the electrode member (B) is installed close to the product for processing (C) on the stirring apparatus side of (C) or opposite side, and a shape such as a rod, net, or net-basket shape is utilized as the electrode member (B) so that the electrical current density is drastically improved.

The present invention is effective for plating of all types including copper plating, nickel plating, cadmium plating, chromium plating, zinc plating, gold plating and tin plating. The plating film can also be formed to uniform thickness in a short time.

Electro-degreasing and electropolishing are important as preprocessing for the above surface treatments. The present invention also makes these processes more efficient for example by boosting the processing speed.

Electroforming is the deposition of a plating such as copper, nickel or iron on the base piece.

Conventional electroform plating yielded a plating film with a thickness of approximately 100 micrometers and required a long period of time. Besides requiring a long period of time, conventional electroform plating also had the problem that many irregularities appeared in the film thickness. However by applying this invention to that process, the upper electrical current density limit can be increased from the conventional 30 A/dm$^2$ to approximately 60 A/dm$^2$. This increase serves to improve production efficiency by 40 percent. Another benefit is that the uniformity of the film thickness is ±2 μm for 300 μm and provides an extremely high quality product. Electroform plating with the method of this invention can be applied for example to manufacturing production molds for optical disks.

DETAILED DESCRIPTION OF THE PREFERRED EMBODIMENTS

Figure 1:
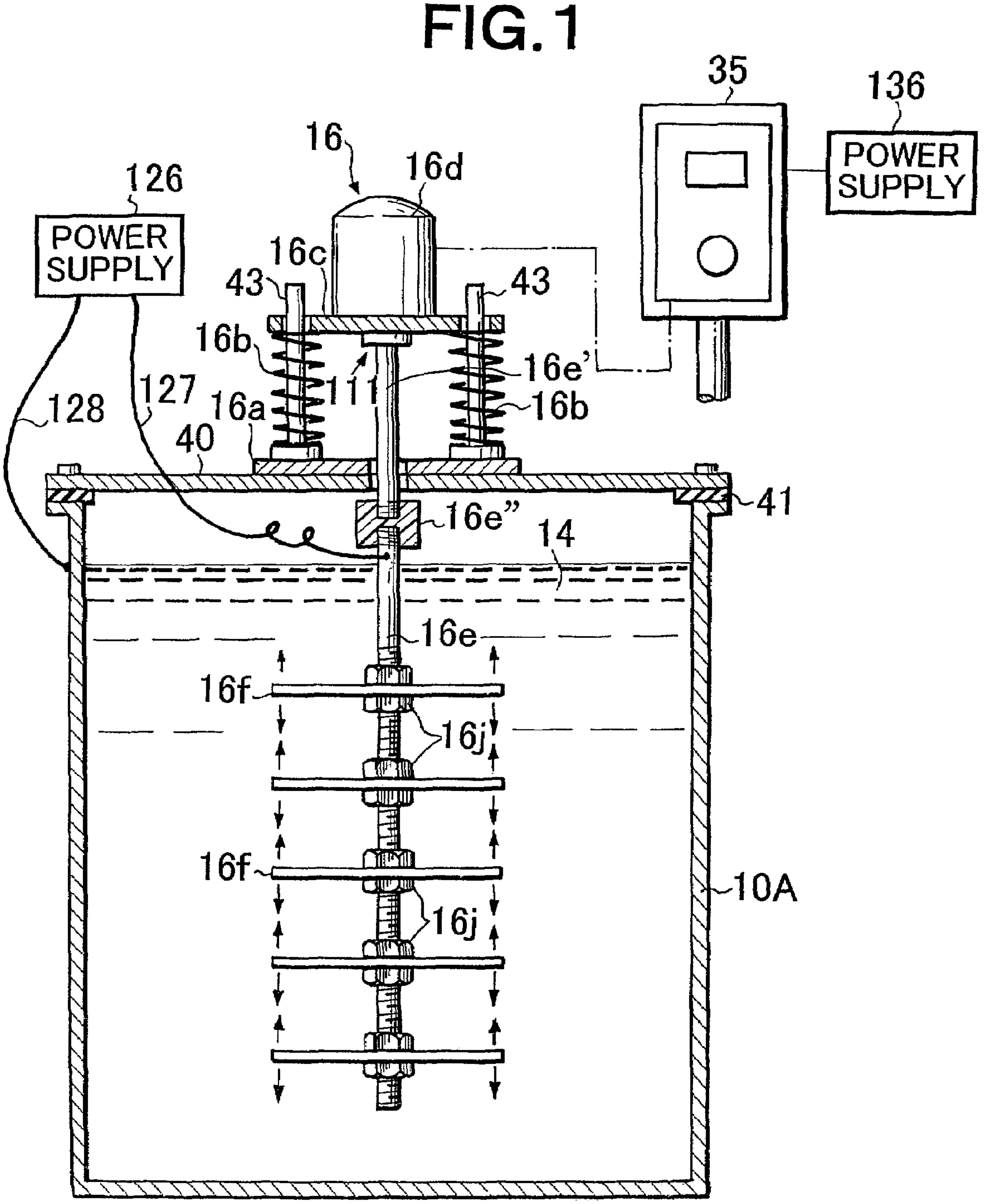
FIG. 1 is a cross sectional view of the liquid treatment apparatus using the insulated vibration-stirring apparatus of the present invention.

The embodiments of the present invention are described next in detail while referring to the drawings. Members or sections in the drawings having the same functions are assigned the same reference numerals.

FIG. 1 is a cross sectional view of the liquid treatment apparatus using the insulated vibration-stirring apparatus of the present invention.

In FIG. 1, the treatment tank (electrolysis tank) is denoted by numeral 10A. The processing fluid 14 is stored in this treatment tank. Reference numeral 16 is the vibration stirring apparatus. The vibration stirring apparatus 16 is comprised of a base 16*a* clamped to a support bed 40 installed via anti-vibration rubber (vibration cushioning member) 41 on the upper edge of treatment tank 10A, a coil spring 16*b* as a vibration absorbing material with the bottom edge clamped to the base, a vibration member 16*c* clamped to the top edge of that coil spring, a vibration motor 16*d* installed on that vibration member, the top edge of a vibrating rod upper section 16*e*' installed on the vibration member 16*c*, a vibrating rod lower section 16*e* installed by way of an insulation area 16*e*" on the lower part of that vibrating rod upper section, and a vibrating vane 16*f* unable to rotate and installed at multiple levels at a position immersed in the processing fluid 14 at the lower half of the vibrating rod lower section. The vibrating rod is comprised of the vibrating rod upper section 16*e*', insulation area 16*e*", vibrating rod lower section 16*e*. A vibration generating means is comprised of a vibration motor 16*d*, and a vibration member 16*c* and that vibration generating means is linked to the vibrating rod. A rod-shaped guide member 43 can be installed towards the top and bottom and clamped to the base 16*a* within the coil spring 16*b*.

Besides general-purpose mechanical vibration motors, the vibration generating means for the vibration stirring apparatus of the present invention may also utilize magnetic oscillating motors and air vibration motors, etc.

A resilient piece such as rubber may also be used along with or instead of the coil spring 16*b* as the vibration strain dispersion member. Vibration strain dispersion members may be made of rubber plate or laminations (layers) of rubber plates and metal plates. These laminated pieces may be joined by adhesive applied between the pieces or may simply be overlapped onto each other. When using these laminated pieces, pieces capable of covering the top opening of the treatment tank 10A can be used so that the treatment tank 10A is sealed tight. In such cases however, a seal should be installed between the vibrating rod and laminated piece so that the vibrating rod passing through the laminated piece can move up and down.

A transistor inverter 35 for controlling the frequency of the vibration motor 16*d* is installed between the vibration motor 16*d* and the power supply 136 for driving that motor 16*d*. The power supply 136 is for example 200 volts. The drive means for this vibration motor 16*d* can also be used in the other embodiments of the present invention.

The vibration motors 16*d* vibrate at 10 to 500 Hertz under control of the inverter 35. These motors 16 preferably vibrate at 20 to 200 Hertz and more preferably vibrate at 20 to 60 Hertz. The vibration generated by the vibration motors 16*d* is transmitted to the vibrating vane 16*f* by way of the vibrating member 16*c* and the vibrating rods (16*e*, 16', 16*e*"). In the description hereafter, for the purposes of simplicity, only the reference number 16*e* is used to represent the vibrating rods.

Figure 2:
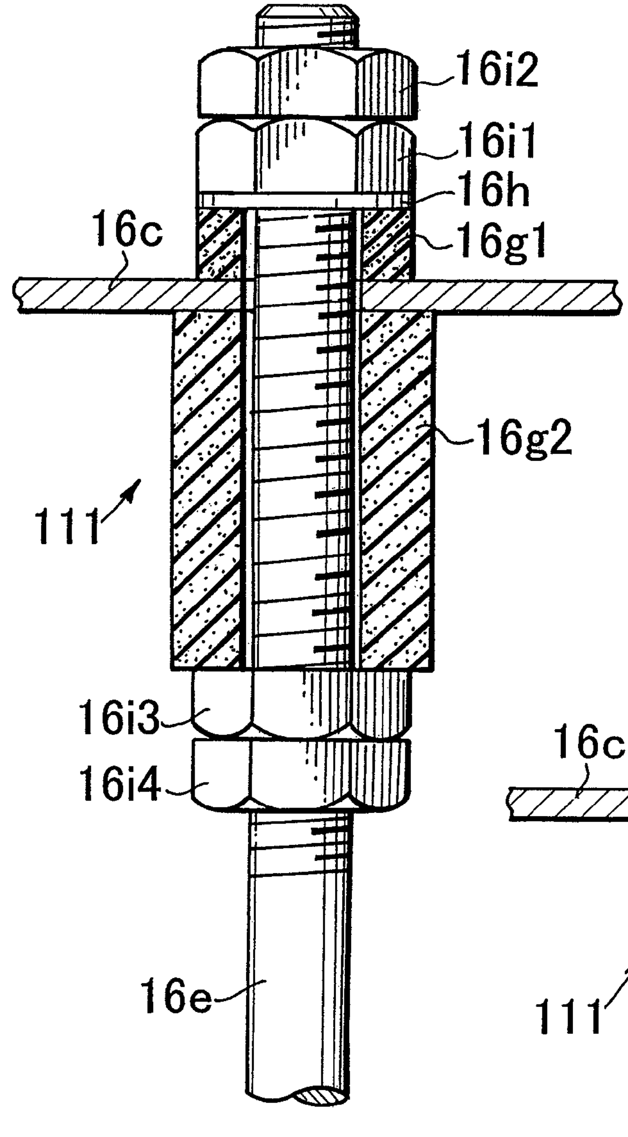
FIG. 2 is an enlarged cross sectional view of the attachment portion for mounting the vibrating rod onto the vibrating member.

FIG. 2 is an enlarged cross sectional view of the attachment portion 111 for mounting the vibrating rod 16*e* onto the vibrating member 16*c*. The nuts 16*i*1, 16*i*2 are fit from the top side of vibration member 16*c*, by way of the vibration strain dispersion member 16*g*1 and washer 16*h*, onto the male screw section formed at the top end of vibrating rod 16*e*. The nuts 16*i*3, 16*i*4 are fit by way of the vibration strain dispersion member 16*g*2 from the bottom side (onto the screw section) of the vibration member 16*c*.

The vibration strain dispersion member 16*g*1, 16*g*2 are utilized as a vibration stress dispersion means made for example from rubber. The vibration strain dispersion member 16*g*1, 16*g*2 can be made from a hard resilient piece for example of natural rubber, hard synthetic rubber, or plastic with a Shore A hardness of 80 to 120 and preferably 90 to 100. Hard urethane rubber with a Shore A hardness of 90 to 100 is particularly preferably in view of its durability and resistance to chemicals. Utilizing the vibration stress dispersion means prevents vibration stress from concentrating on the near side of the junction of vibrating member 16*c* and the vibrating rod 16*e*, and makes the vibrating rod 16*e* more difficult to break. Raising the vibration frequency of the vibrating motors 16*d* to 100 Hertz or higher is particularly effective in preventing breakage of the vibrating rod 16*e*.

Figure 3:
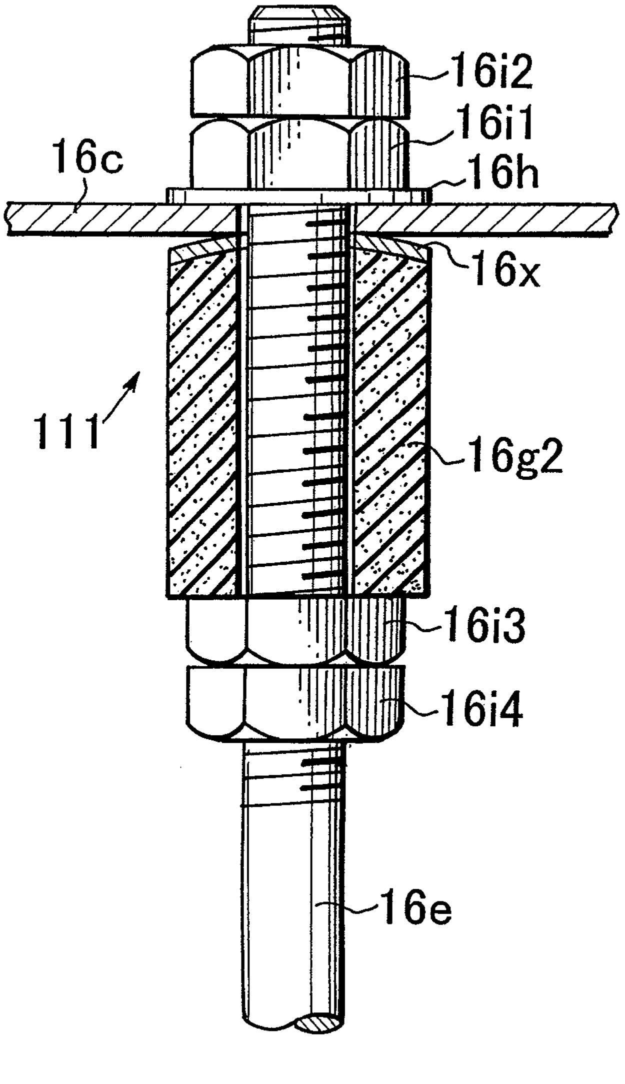
FIG. 3 is an enlarged cross sectional view of a variation of the attachment portion for mounting the vibrating rod onto the vibrating member.

FIG. 3 is an enlarged cross sectional view of the attachment portion 111 for mounting the vibrating rod 16*e* onto the vibrating member 16*c*. This variation differs from the attachment portion of FIG. 2, only in that the vibration strain dispersion member 16*g*1 is not installed on the top side of the vibration member 16*c*, and in that there is a spherical spacer 16*x* between the vibration member 16*c* and the vibration strain dispersion member 16*g*2. In all other respects this variation is identical.

In FIG. 1, the vibrating vane 16*f* is clamped with vibrating vane clamp members 16*j* comprised of nuts fitting onto male screws installed on the bottom side of the vibrating rod 16*e*. The tip edges of the vibrating vane 16*f* vibrate at the necessary frequency in the processing liquid. This vibration causes the vibrating vane 16*f* to generate a ripple or "flutter" to occur towards the edges of the vane from the attachment portion on the on the vibrating rod 16*e*. The amplitude and frequency of this vibration will vary according to the motor 16*d*. However these are basically determined according to the interaction between the processing liquid 14 and the force dynamics of the vibration transmission path. In the present embodiment, the amplitude (vibration width) is preferably 0.1 to 30 millimeters and the frequency is 200 to 12,000 times per minute.

Resilient metal plate or plastic plate (electrically conductive on at least its surface) may be used as the vibrating vane 16*f*. A satisfactory thickness range for the vibrating vane 16*f* differs according to the vibration conditions and viscosity of the electrolytic fluid 14. However, during operation of the vibration-stirring means 16, the vibrating vanes should be set so the tips of the vibrating vanes 16*f* provide an oscillation (flutter phenomenon) for increasing the stirring (or agitating) efficiency, without breaking the vibrating vane. If the vibrating vane 16*f* is made from metal plate such as stainless steel plate, then the thickness can be set from 0.2 to 2 millimeters. If the vibrating vane 16*f* is made from plastic plate then the thickness can be set from 0.5 to 10 millimeters. The vibrating vane 16*f* and clamping member 16*j* can be integrated into one piece. Integrating them into one piece avoids the problem of having to wash away electrolytic fluid 14 that penetrates into the junction between the vibrating vane 16*f* and clamp member 16*j* and hardens and adheres there.

The material for the metallic vibrating vane 16*f* may be titanium, aluminum, copper, steel, stainless steel, a ferromagnetic metal such as ferromagnetic steel, or an alloy of these metals. The material for the plastic vibrating vane 16*f* may be polycarbonate, vinyl chloride resin, polyprophylene, etc.

Figure 14:
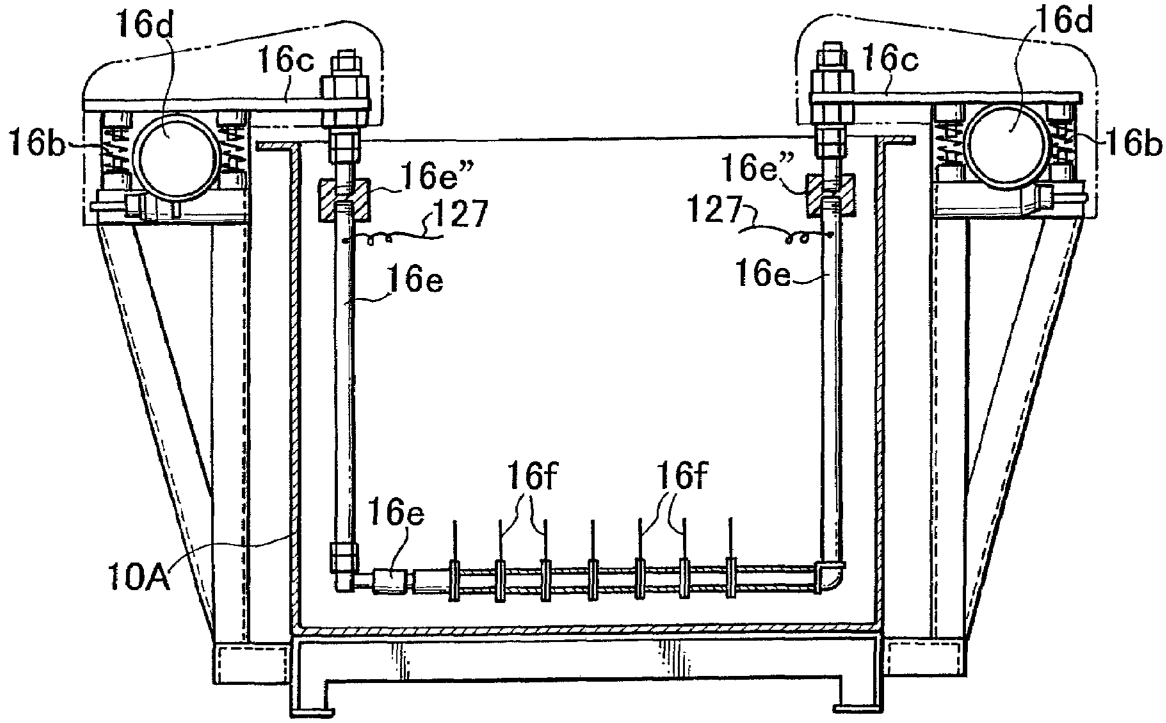
FIG. 14 is a cross sectional view of the liquid treatment apparatus using the insulated vibration-stirring apparatus of the present invention.

The extent of the "flutter phenomenon" generated by the vibrating vane that accompanies the vibration of vibrating vane 16*f* within the electrolytic fluid 14 will vary depending on the vibration frequency of the vibration motors 16*d*, the length of the vibrating vane 16*f* (dimension from the tip of clamping member 16*j* to the tip of vibrating vane 16*f*), and thickness, and viscosity and specific gravity of the electrolytic fluid 14, etc. The length and thickness of the "fluttering" vibrating vane 16*f* can be best selected based on the applied frequency. By making the vibration frequency of vibrating motor 16*d* and thickness of vibrating vane 16*f* fixed values, and then varying the length of vibrating vane 16*f*, the extent of vibrating vane flutter will be as shown in FIG. 14. In other words, the flutter will increase up to a certain stage as the length m of vibrating vane 16*f* is increased, but when that point is exceeded, the extent F of the flutter will become smaller. As can be understood from the graph, at a certain length the flutter will be almost zero and if the vane is further lengthened the flutter increases and this process continuously repeats itself.

Preferably a length $L_1$ shown as the No. 1 peak or a length $L_2$ shown as the No. 2 peak is selected for the length of the vibrating vane 16*f*. Here, $L_1$ or $L_1$ can be selected as needed, according to whether one wants to boost the path vibration or the flow. When $L_3$ shown here as the No. 3 peak was selected, the amplitude will tend to diminish however this has the advantage that the surface area can be increased when utilizing the vibrating vane as an electrode.

The vibrating vanes 16*f* can be installed on a single or multiple (for example, 2 to 8 levels) on the vibrating rod 16*e*. The number of vibrating vane levels depends on the performance of the vibration motor and the quantity of processing fluid 14. The number of levels can be selected as needed according to the vibration-stirring that is required.

Figure 5:
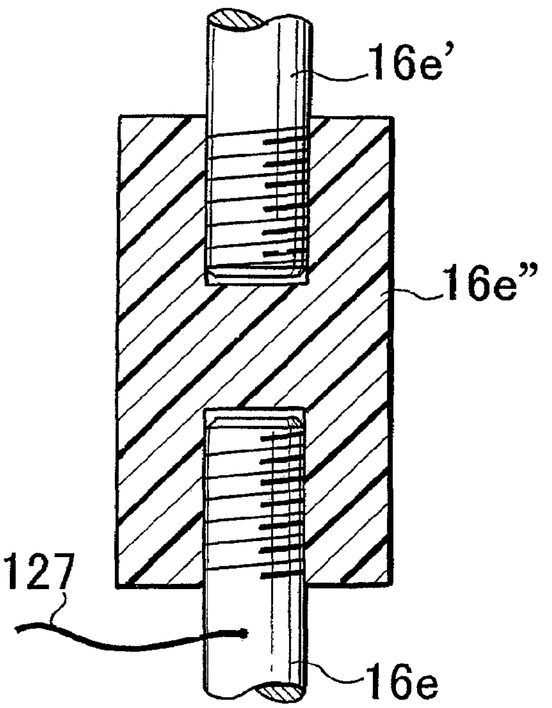
FIG. 5 is an enlarged fragmentary cross sectional view showing the vicinity of the electrical insulation area on the vibrating rod.
Figure 6:
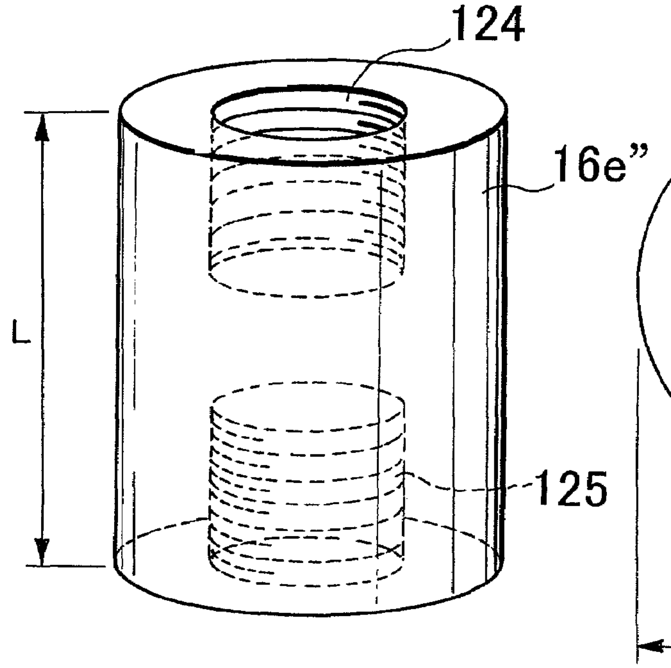
FIG. 6 is a perspective view showing the electrical insulation area on the vibrating rod.
Figure 7:
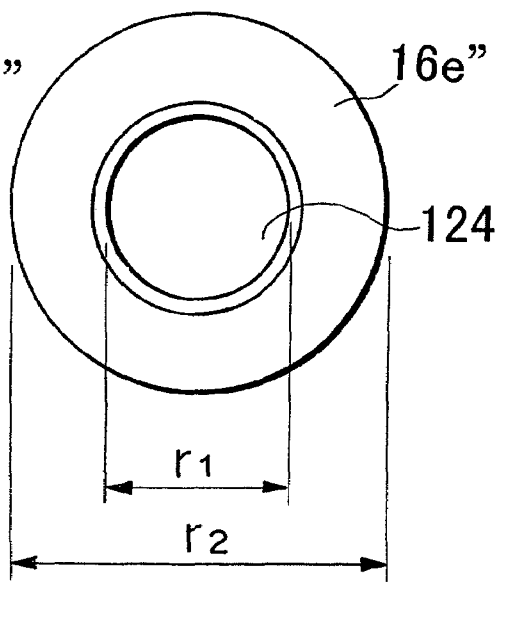
FIG. 7 is a flat view showing the electrical insulation area on the vibrating rod.

FIG. 5 is an enlarged fragmentary cross sectional view showing the vicinity of the electrical insulation area 16*e*" on the vibrating rod. FIG. 6 is a perspective view showing the electrical insulation area 16*e*" on the vibrating rod. FIG. 7 is a flat view of that electrical insulation area.

The electrical insulation area 16*e*" can be formed for example from plastic or rubber. The electrical insulation area 16*e*" is a structural part on the vibrating rod so preferably material should be selected that is able to sufficiently transmit the vibration of the vibrating motor without breaking due to the vibration and also have good insulating properties. In view of these conditions hard rubber is most preferable. One potential material is hard polyurethane rubber. If the member comprised only of insulation material has insufficient strength then a member made only of insulating material can for example be augmented with metal to obtain the required mechanical strength.

More specifically, the electrical insulation area 16*e*" may be made from a cylindrical insulating member (optional shape such as a polygon) manufactured from hard rubber as shown in the drawing. Insertion holes 124, 125 are formed in the center upper and lower sections to allow insertion respectively of the vibrating rod upper section 16*e*' and a vibrating rod lower section 16*e*. These holes do not allow passage all the way through (are not open on both sides) and the blocked section of the hole therefore functions as an insulating section.

If these upper and lower insertion holes allow passage all the way through (open on both sides) then insulation material can be filled into the hole spaces where the rod is not inserted or a space allowing sufficient insulation can be established so that the vibrating rod upper section 16*e*' and a vibrating rod lower section 16*e* do not make contact. The cylindrical insulation material for the insertion holes 124, 125 serves to couple the vibrating rod upper section 16*e*' and vibrating rod lower section 16*e*. This coupling may be made with a setscrew (For example, cutting the male screws on the top edge of vibrating rod lower section 16*e* and the bottom edge of vibrating rod upper section 16*e*', cutting the female screws in insertion holes 124, 125, and joining both of them. Also applying a washer on the joint if further needed, and clamping with a machine screw.) or joining them with adhesive. Any other kind of structure may be used for this section as long as it achieves the object of the present invention.

For example, when the vibrating rod has a diameter of 13 millimeters, the insulation area 16*e*" has a length (height) L for example of 100 millimeters, the outer diameter $r_2$ for example is 40 millimeters, and the inner diameter $r_2$ of the insertion holes 124, 125 is 13 millimeters.

As shown in FIG. 1 and in FIG. 5, an electrical line 127 connects to the upper section of vibrating rod lower section 16*e* from directly below the electrical insulation area 16*e*". This electrical line 127 is connected to a power supply 126 and an electrical line 127 connects the treatment tank 10A to the power supply 126 as shown in FIG. 1. When the vibrating rod lower section 16*e*, vibrating vane clamp member 16*j* and vibrating vane 16*f* are made from an electrically conductive member such as metal, then an electrical current flow between the vibrating rod lower section 16*e*, vibrating vane clamp member 16*j* and vibrating vane 16*f* and treatment tank 10A, based on a voltage applied across vibrating rod lower section 16*e* and treatment tank 16*e* from the power supply 126 by way of the electrical lines 127 and 128. Vibration-stirring to process the processing liquid 14 is performed in this way. The power supply voltage may be alternating current voltage, direct current voltage or pulse voltage as desired. The power supply voltage value varies according to the desired processing and may for example by 1 to 15 volts. The power supply current value also varies according to the desired processing and may for example be 0.5 to 100 amperes.

An electrode member connected to the electrical line 127 may be installed inside the treatment tank 10A. In this way, power can be conducted by the processing liquid 14 to achieve even higher electrical current density among the vibrating rod lower section 16*e*, vibrating vane clamp member 16*j*, vibrating vane 16*f* serving as electrodes. Also, one more vibration-sting apparatus identical to the present embodiment can be installed within the treatment tank 10A, and by connecting the lower section of that vibrating rod to the electrical line 127, power can be conducted by the processing liquid 14 among the vibrating rod lower section 16*e*, vibrating vane clamp member 16*j*, vibrating vane 16*f* of the two vibration-stirring apparatus. The distance between the electrode members (for example, vibrating vane 16*f* utilized as one electrode, and treatment tank 10A utilized as the other electrode, or dedicated anode and cathode members) installed to make contact as electrodes in the processing liquid 14 for conducting power, may for example be 20 to 400 millimeters with no danger of electrical shorts occurring during processing.

The processing of the processing liquid 14 may for example be disinfecting of the liquid by conducting electrical power. In other words, germs tend to propagate in the plating when the chlorine ions are removed from the plating liquid, speeding up the deterioration of the plating liquid. However the propagation of these germs can be prevented by applying electrical power. This method may also be utilized for disinfecting water for washing, tableware, vegetables and fruits or disinfecting beverages such as water or milk. Other processing of the processing liquid 14 may for example be electrolysis to separate for example water into oxygen and hydrogen.

When the processing liquid used is for example, diluted chlorine (water-soluble), then the cathode material in this processing may be platinum, platinum alloy, platinum type metal or an alloy sheath. When for example the processing liquid is caustic alkali (water-soluble) then the cathode material may be nickel, nickel alloy, iron, iron alloy, carbon steel, or stainless steel, etc.

In the present embodiment, the vibrating rod upper section 16*e*' is electrically insulated from the vibrating rod lower section 16*e* by the insulation area 16*e*" so there is no effect on the vibrating motors 16*d* from the power conducting by way of the vibrating rod lower section 16*e*. Also in this embodiment, the insulation area 16*e*" has heat insulating properties so the vibrating rod lower section 16*e* is also heat-insulated from the vibrating rod upper section 16*e*', so there is little effect from the temperature of the processing liquid 14 on the vibrating motors 16*d*. Therefore there is no heat deterioration on the vibrating motors 16*d* regardless of whether the processing fluid 14 is a high temperature or a low temperature.

Also in the present embodiment, an electrode member connected to the power supply 126 is installed within the treatment tank 10A without utilizing the vibrating vane of the insulated vibration-sting apparatus as an electrode. So an insulation area 16*e*" is present, even when conducting power to the processing fluid 14 using the electrode member. There is therefore no effect on the vibrating motors 16*d* from supplying electrical power to the processing fluid 14.

Figure 8:
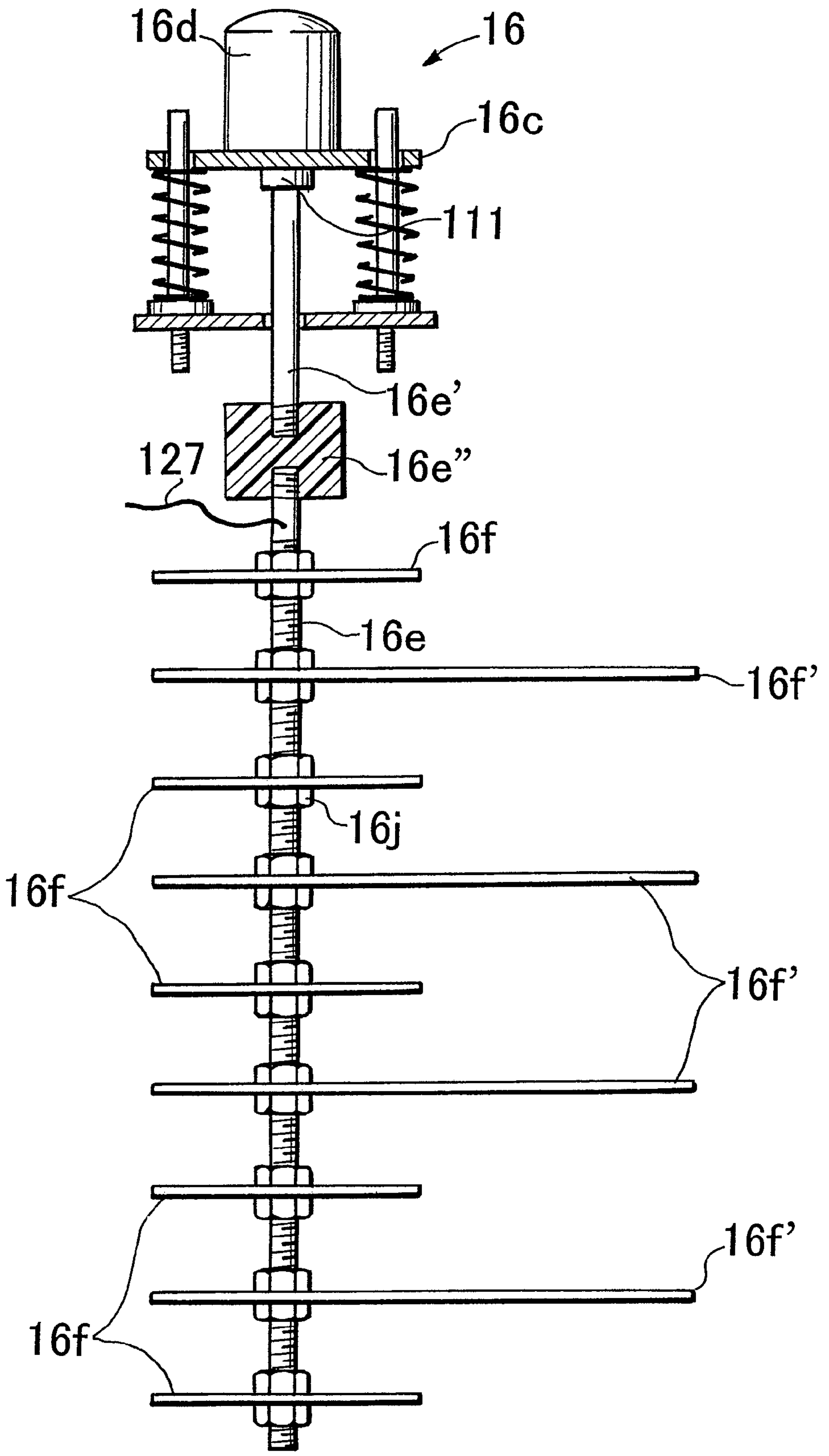
FIG. 8 is a side view showing the insulated vibration-stirring apparatus of the present invention.

FIG. 8 is a side view showing another embodiment of the insulated vibration-stirring apparatus of the present invention. This embodiment differs from the embodiment of FIG. 1 only in that the electrode support vanes 16*f* are installed on the vibrating rod lower section 16*e* at mutually alternate positions versus the vibrating vane 16*f*. The electrode support vane 16*f* is electrically connected to the vibrating rod lower section 16*e* and functions as one electrode when applying power to the processing fluid 14 and therefore does not require a vibration-stirring function. The purpose of the electrode support vane 16*f* is to increase the electrode surface area and to decrease the gap between that electrode and the electrode on the opposite side so the size (surface area) of the electrode support vane 16*f* is preferably larger than the vibrating vane 16*f*. Also, as shown in the drawing, the tip (right edge) of the electrode support vane 16*f*" preferably protrudes farther to the right than the tip (right edge) of the vibrating vane 16*f*.

The electrode support vane 16*f*" is preferably installed at a position midway between a vibrating vane and a vibrating vane on the vibrating rod. However the installation position is not limited to this position and may be installed at a position in proximity to a vibrating vane from above or below as long as there is not drastic reduction in the vibration-stirring effect. The electrode support vane 16*f*" can be installed on the vibrating rod lower section 16*e* in the same way as the vibrating vane 16*f* was installed.

The material of the electrode support vane 16*f*" may be any material allowing use as an electrode. However since it must vibrate along the vibrating rod it must be sufficiently tough to withstand vibration. A conductive piece capable of use as a vibrating vane may for example by made of titanium (platinum plating can be deposited on its surface) or stainless steel (platinum plating can be deposited on its surface). The vibrating vane 16*f* need not always be an electrically conductive material when using the electrode support vane 16*f*", and may be made of plastic.

Figure 9:
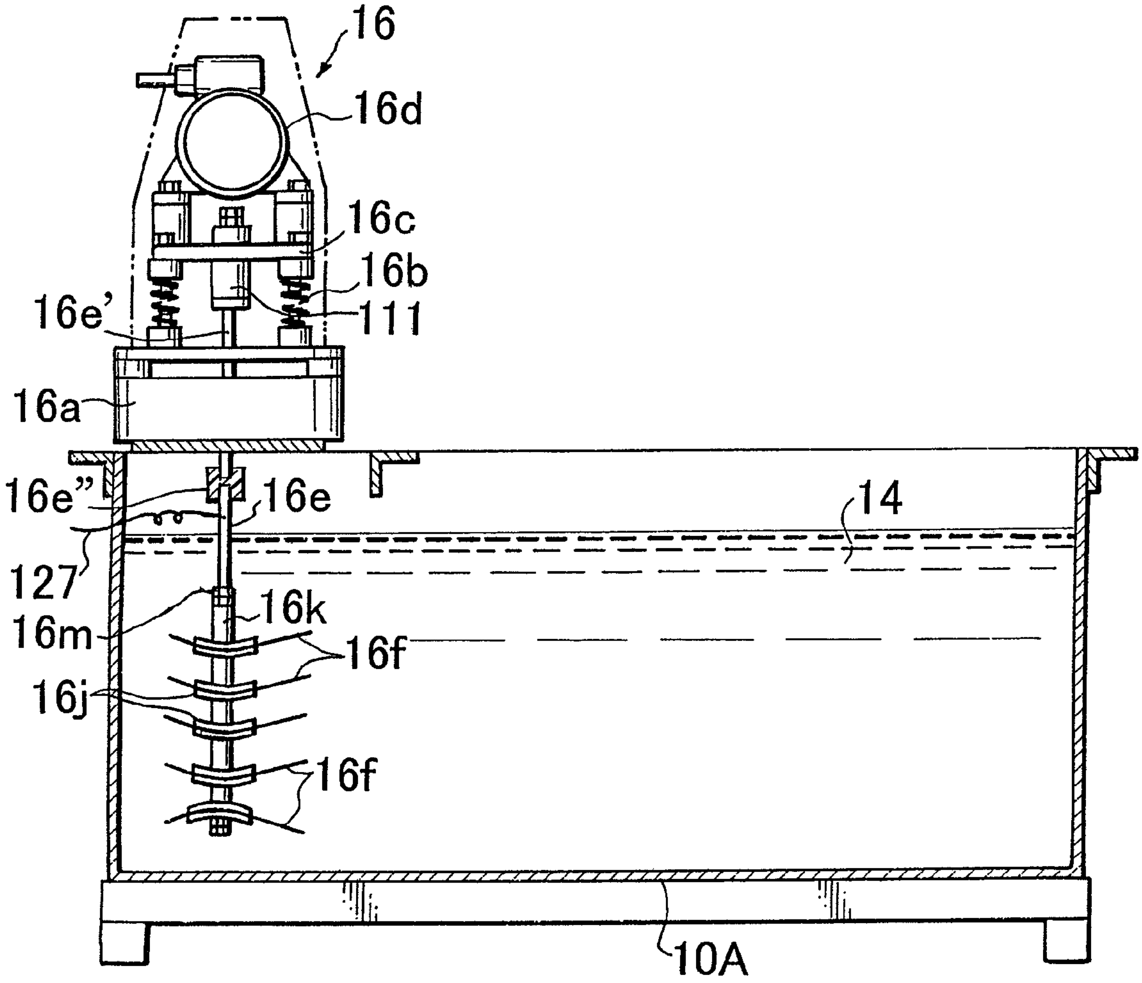
FIG. 9 is a cross sectional view of the liquid treatment apparatus using the insulated vibration-stirring apparatus of the present invention.
Figure 10:
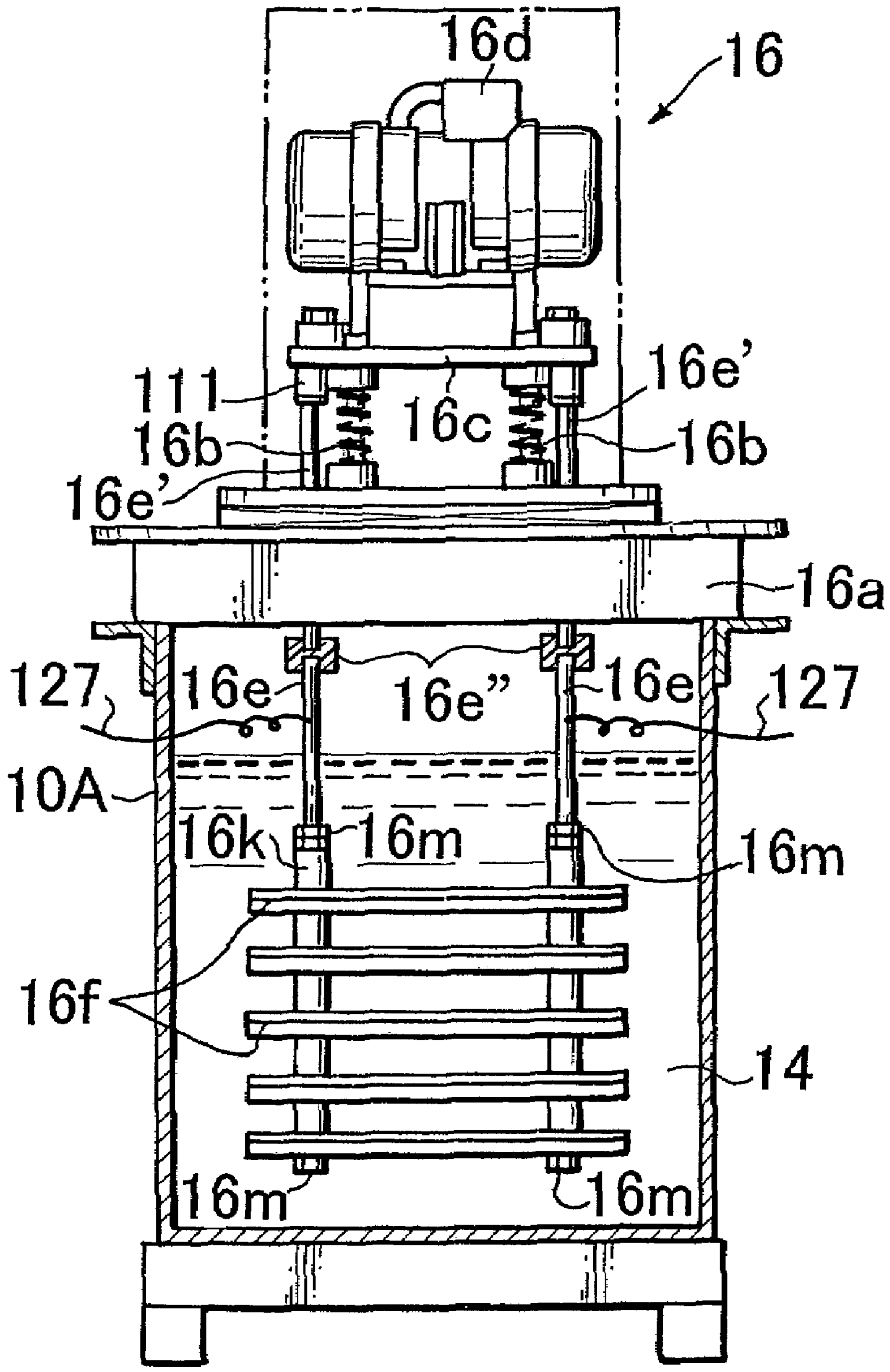
FIG. 10 is a cross sectional view of the liquid treatment apparatus using the insulated vibration-stirring apparatus of the present invention.
Figure 11:
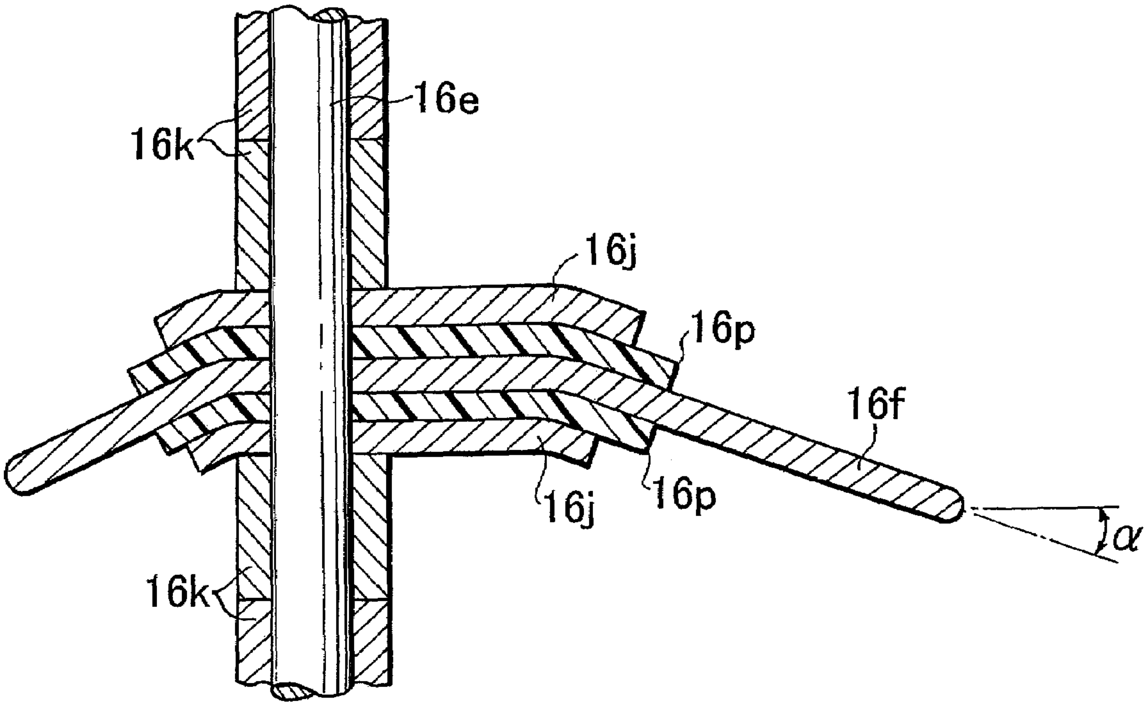
FIG. 11 is an enlarged cross sectional view of the attachment portion for mounting the vibrating vane onto the vibrating rod.

FIG. 9 and FIG. 10 are cross sectional views of the liquid treatment apparatus in the insulated vibration-stirring apparatus of the present invention. FIG. 11 is an enlarged cross sectional view of the attachment portion for mounting the vibrating vane 16*f* onto the vibrating rod 16*e*.

In this embodiment, the vibrating vanes are installed on two vibrating rods. As shown in FIG. 11, the vibrating vane clamp members 16*j* are installed on both the upper and lower sides of each vibrating vane 16*f*. Spacer rings 16*k* are installed at intervals in the adjacent vibrating vanes 16*f* by way of the vibrating vane clamp members 16*j* or setting the spacing. A nut 16*m* is screwed on to the vibrating rod 16*e* formed as a male screw (with or without spacer rings 16*k*) on the upper side of the topmost section of vibrating vane 16*f*, and the lower side of the bottom-most section of the vibrating vane 16*f* as shown in FIG. 10. As shown in FIG. 11, the breakage of the vibrating vane 16*f* can be prevented by installing a resilient member sheet 16*p* as the vibration dispersion means made from fluorine plastic or fluorine rubber between each vibrating vane 16*f* and clamping member 16*j*. The resilient member sheet 16*p* is preferably installed to protrude outwards somewhat from the clamping member 16*j* in order to further enhance the breakage prevention effect of the vibrating vane 16*f* This resilient member sheet 16*p* can also be used in the same way in the other embodiments. The vibrating rod 16*e* and the vibrating vane 16*f* are electrically connected.

As shown in the figure, the lower surface (press contact surface) of the upper side of clamping member 16*j* is formed with a protruding surface, and the upper surface (press contact surface) of the lower side clamping member 16*j* is formed with a recessed surface. The section of the vibrating vane 16*f* compressed from above and below by the clamping member 16*j* is in this way forced in a curved shape, and the tip of the vibrating vane 16*f* forms an angle, relative to the horizontal surface. This a angle can be set to −30 degrees or more and 30 degrees or less, and preferably is set −20 degrees or more and 20 degrees or less. The α angle in particular, is −30 degrees or more and −5 degrees or less, or is 5 degrees or more and 30 degrees or less, and preferably is set to −20 degrees or more and −10 degrees or less, or to 10 degrees or more and 20 degrees or less. The α angle is 0 if the clamping member 16*j* (press contact) surface is flat. The α angle need not be the same for all the vibrating vanes 16*f*. For example, the lower one to two vanes on vibrating vane 16*f* may be set to a minus value (in other words, facing downwards: facing as shown in FIG. 11) and all other vanes on vibrating vane 16*f* set to a plus value (in other words facing upwards: the reverse of the value shown in FIG. 11). When using electrode support vanes these can be set to face downward or face upward at an appropriate angle the same as the vibrating vane 16*f*.

Figure 12:
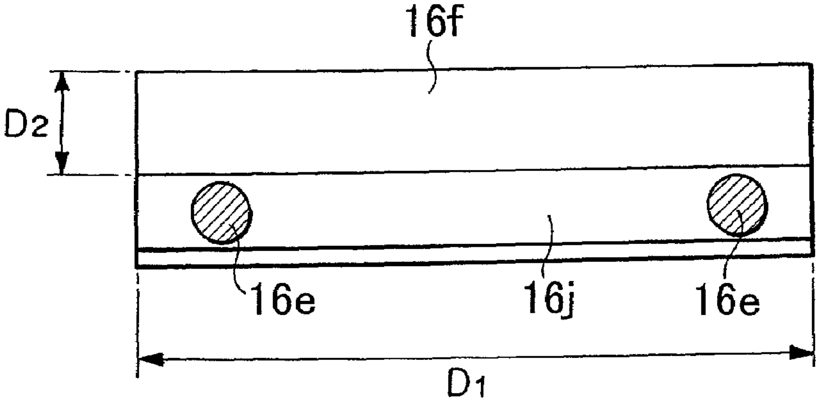
FIG. 12 is a cross sectional view showing the vicinity of the vibrating vane.

FIG. 12 is a cross sectional view showing the vicinity of the vibrating vane 16*f*. The section of the vibrating vane 16*f* protruding out from the clamping member 16*j* contributes to generating a vibration flow motion. This protruding section has a width $D_1$ and length of $D_2$. In this embodiment, the vibrating vanes are installed across the multiple vibrating rods. The vibration surface area of the vibration vanes can therefore be made sufficiently large. The surface area utilized as the electrode can also be made large.

In this embodiment, a rod-shaped upper guide member clamped to the vibrating member 16*c* and a rod-shaped lower guide member clamped to the base 16*a* are installed at suitable intervals within the coil spring 16*b*.

Though not shown in the drawing, the present embodiment utilizes a power supply 126 (for processing) and an electrical line 128 as described for FIG. 1.

In this embodiment also, the electrode support vanes are used in the same way as the embodiment for FIG. 8.

Figure 13:
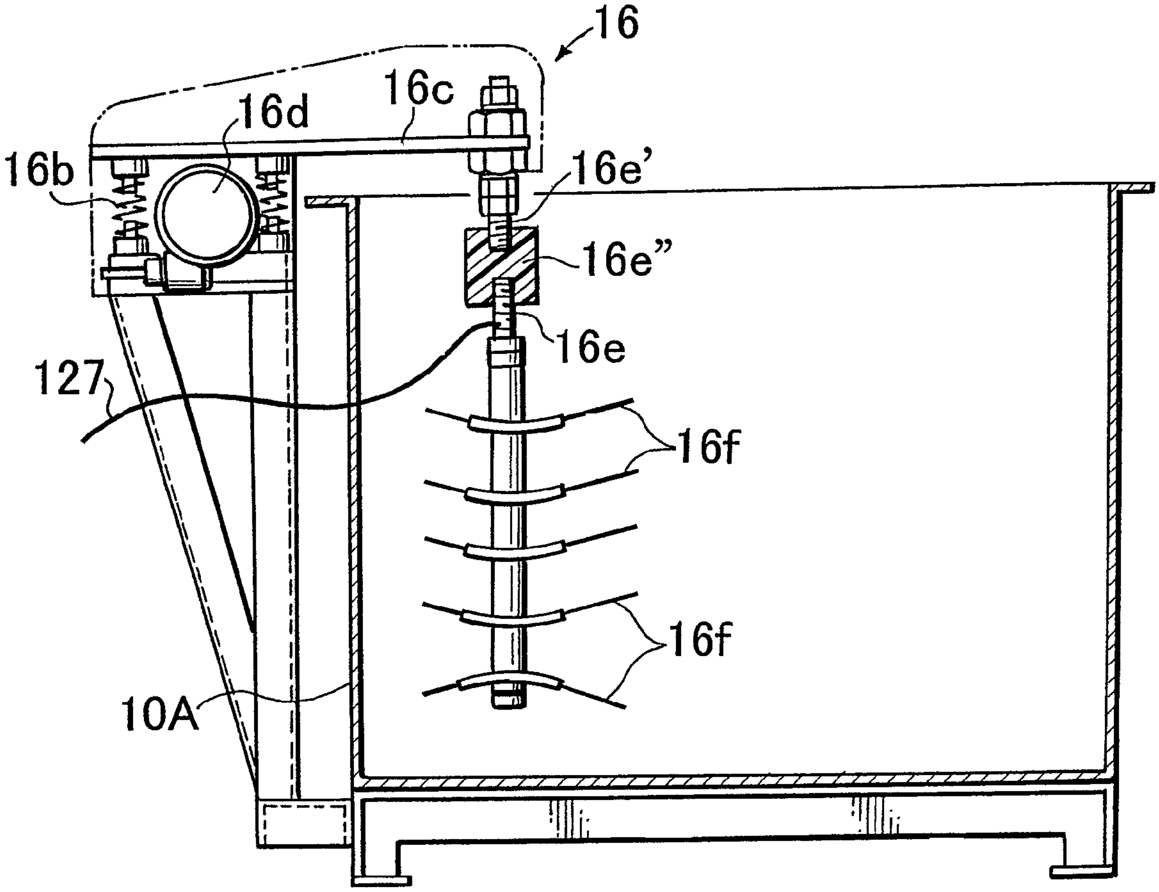
FIG. 13 is a cross sectional view of the liquid treatment apparatus using the insulated vibration-stirring apparatus of the present invention.

FIG. 13 is a cross sectional view of another embodiment of the liquid treatment apparatus using the insulated vibration-stirring apparatus of the present invention. In this embodiment of the vibration-stirring apparatus 16, the vibration motor 16*d* is installed outside the treatment tank 10A, and the vibration member 16*c* extends towards the treatment tank 10A.

Though not shown in the drawing, the present embodiment also utilizes a power supply 126 (for processing) and an electrical line 128 as described for FIG. 1.

FIG. 14 is a cross sectional view of another embodiment of the liquid treatment apparatus using the insulated vibration-stirring apparatus of the present invention. In this embodiment, the same vibration motor 16*d*, vibration member 16*c*, vibrating rod upper section 16*e*', and the electrical insulation area 16*e*" are installed as a set on both sides of the treatment tank 14. The vibrating rod lower section 16*e* is formed in the shape of a square open on the left side, and the two perpendicular sections are installed on the two corresponding insulation areas 16*e*". The top edges of the two perpendicular section of 16*e* are respectively connected by way of the electrical insulation areas 16*e*" to the vibrating rod upper section 16*e*. The vibrating vane 16*f* is installed nearly perpendicular to the horizontal section of the vibrating rod lower section 16*e*. The vibrating vanes 16*f* may be installed tilted relative to the perpendicular direction, the same as previously described.

Though not shown in the drawing, the present embodiment also utilizes a power supply 126 (for processing) and an electrical line 128 as described for FIG. 1.

In this embodiment for FIG. 13 and the embodiment for FIG. 14, the electrode support vanes are used in the same way as the embodiment for FIG. 8.

Figure 15:
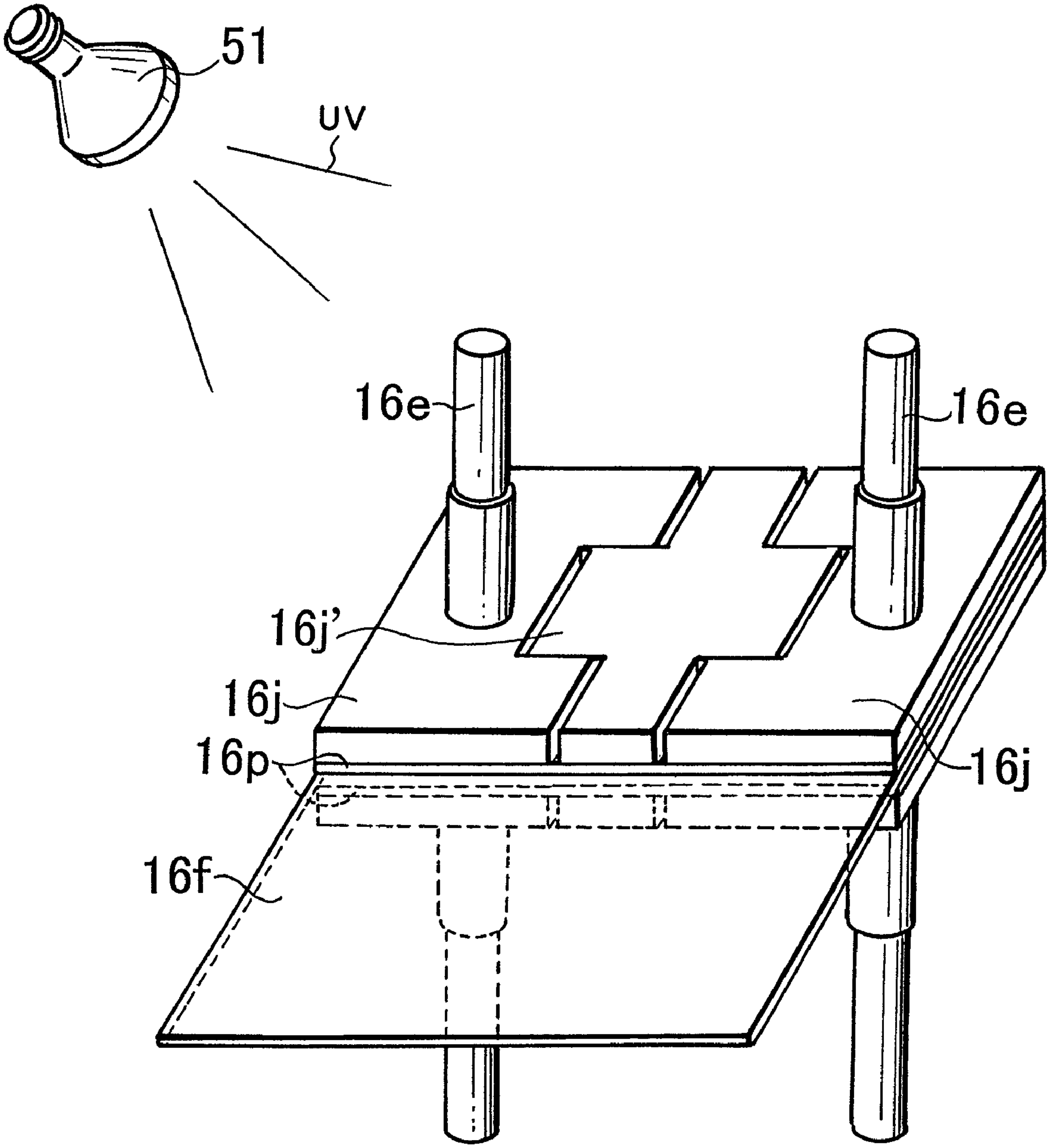
FIG. 15 is a perspective enlarged fragmentary view of the insulated vibration-stirring apparatus of the present invention.

FIG. 15 is a perspective enlarged fragmentary view showing a variation of the insulated vibration-stirring apparatus of the present invention. In this adaptation (or variation), a piece having a surface made from titanium oxide functioning as a photo-activated catalyst is used as the vibrating vane clamp member 16*j* for the vibrating vane 16*f*. Furthermore, a ferromagnetic member (magnet) 16*j*' is fit into a section of that clamp member 16*j*. Therefore, ultraviolet (UV) light emitted from the ultraviolet lamp 51 irradiates the clamp member 16*j*. At the same time, while power is applied to the processing liquid by way of the vibrating rod 16*e*, the clamp member 16*j* and vibrating vane 16*f*, the same as in the above embodiment, the liquid treatment apparatus for vibration stirring of the processing liquid, renders a disinfectant effect by magnetism generated from the ferromagnetic member 16*j*', a disinfectant effect based on the photo-activated catalyst of clamp member 16*j* and a disinfectant effect rendered by the conduction of electricity. An ample amount of processing liquid is also supplied to the vibrating rod 16*e*, clamp member 16*j*, ferromagnetic member 16*j*' and vibrating vanes 16*f* and extremely efficient disinfecting of the processing liquid is achieved.

One technique for forming the surface made for example from titanium oxide is composite plating containing fine particles (particles of 51*m* or less) such as $TiO_2$. The surface having these kind of photocatalytic properties can be formed not only on the clamp member 16*j* but also on members (For example, vibrating vane 16*f* and inner tank member 61 in the embodiment of FIG. 34 described later on.) requiring the same disinfectant processing.

Though not shown in the drawing, the present embodiment also utilizes a power supply 126 (for processing) and an electrical line 128 as described for FIG. 1.

Figure 34:
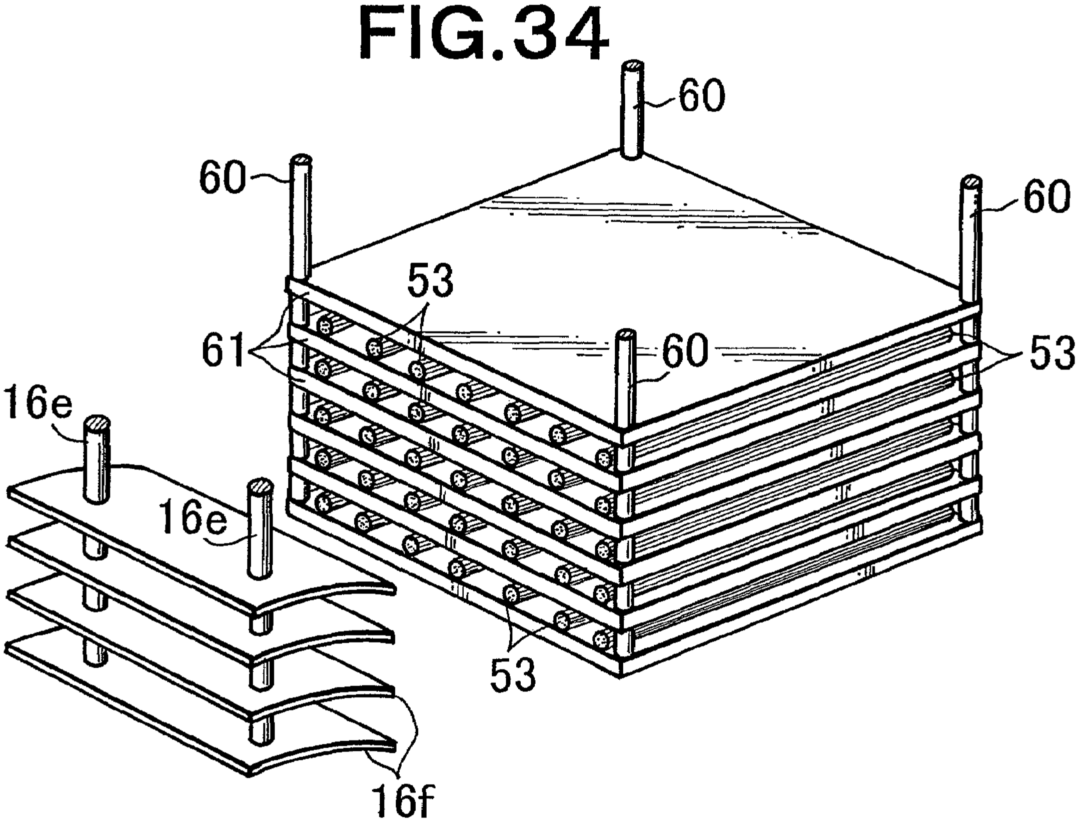
FIG. 34 is a fragmentary perspective view of the liquid treatment apparatus using the insulated vibration-stirring apparatus of the present invention.

FIG. 34 is a fragmentary perspective view showing a variation of this kind of liquid treatment apparatus. In this variation, multiple inner tank members 61 having a surface made for example from titanium oxide and having photocatalytic properties are affixed in parallel by a support member 60. These adjacent inner tank members 61 are enclosed by optical fibers 53. These optical fibers 53 are mutually installed in parallel and an exposure section is formed for example by surface roughing on the side surfaces. Ultraviolet light supplied from an ultraviolet light source not shown in the drawing is emitted from one end of the of the optical fiber 53. Ultraviolet light from the optical fiber exposure section in this way irradiates the adjacent inner tank members 61, power is conducted to the processing liquid by way of the vibrating rod 16*e* and clamp member 16*j* and vibrating vane 16*f* in the same manner as the above embodiments. The disinfectant effect based on photocatalytic activation of the inner tank members 61 is rendered simultaneously with the disinfectant effect from power conduction. An ample amount of processing liquid is also supplied to the vibrating rod 16*e*, clamp member 16*j*, and vibrating vanes 16*f* as well as the inner tank members 61 and extremely efficient disinfecting of the processing liquid is achieved. The electrical lines 127 and a (processing) power supply 126 connecting the vibrating rod lower section 16*e* and electrical insulation area 16*e*" are not shown in the drawing but are installed the same as the above embodiments.

In this embodiment, ultraviolet light is irradiated onto the inner tank members 61 from an extremely close position so that the disinfectant effect is strong even when the transmittance of the ultraviolet light in the processing liquid is low (for example when the processing liquid is milk.)

Though not utilizing the insulated vibration-stirring apparatus of the present invention, similar disinfectant processes are disclosed in the Japanese patent applications JP-A No. 271189/2001 and JP-A No. 102323/2002 of the present inventors.

Figure 16:
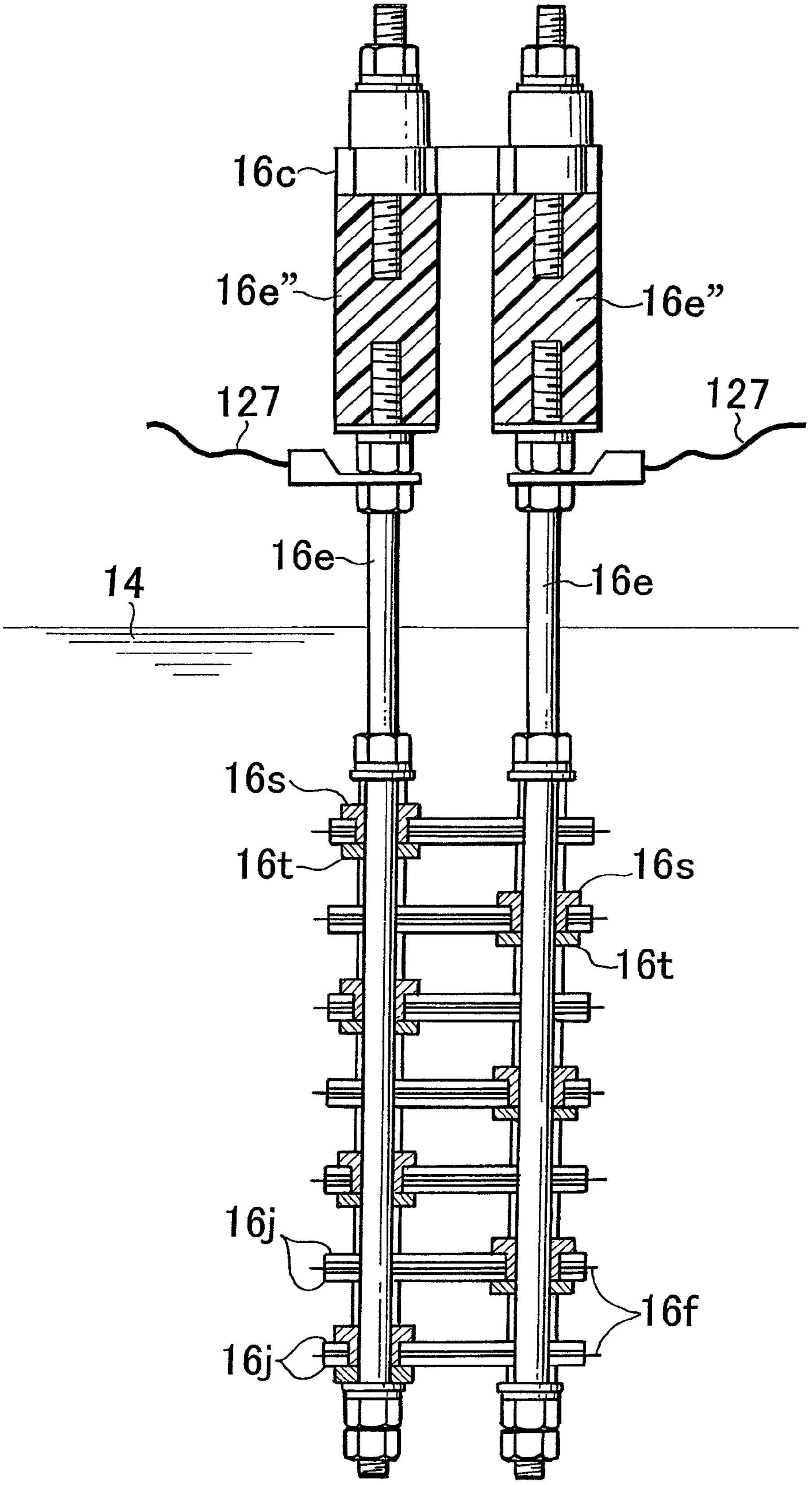
FIG. 16 is a fragmentary cross sectional view of the liquid treatment apparatus used in the insulated vibration-stirring apparatus of the present invention.
Figure 17:
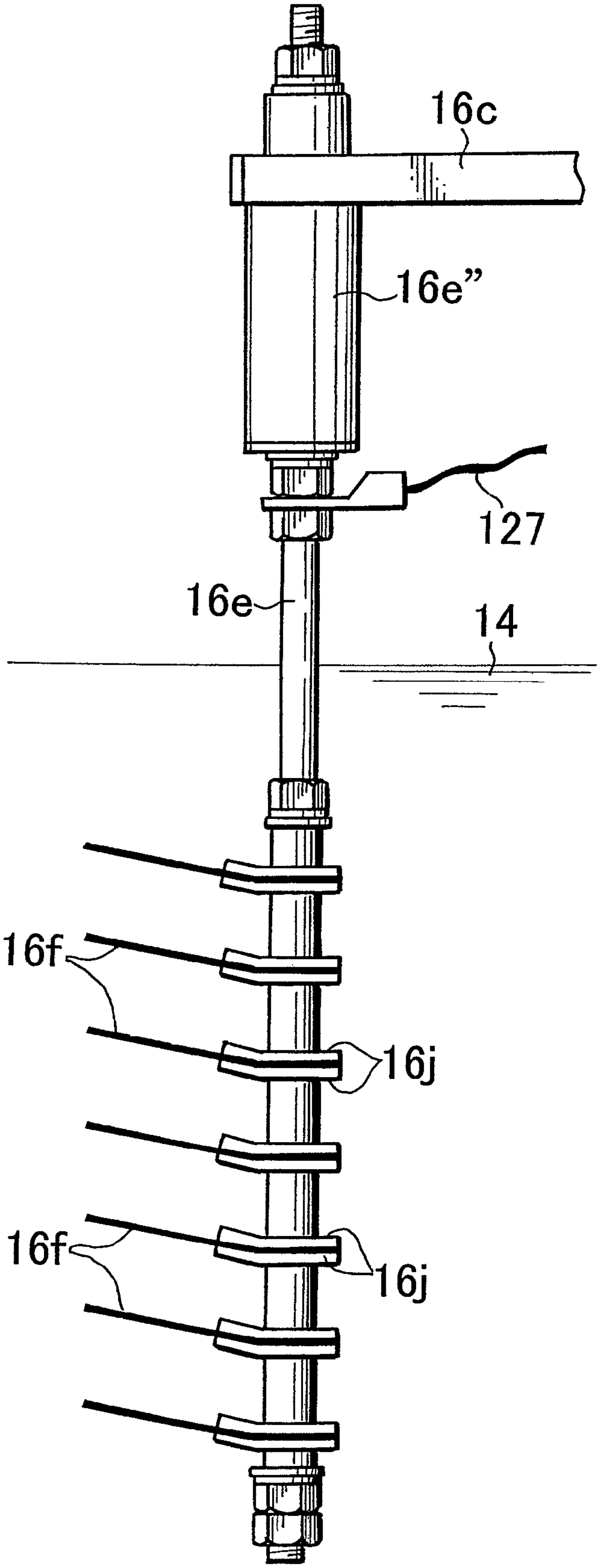
FIG. 17 is a fragmentary side view of the liquid treatment apparatus using the insulated vibration-stirring apparatus of the present invention.

FIG. 16 is a fragmentary cross sectional view of another embodiment of the liquid treatment apparatus using the insulated vibration-stirring apparatus of the present invention. FIG. 17 is a fragmentary side view of that liquid treatment apparatus.

In this embodiment, the vibrating vane 16*e* and clamp member 16*j* mechanically connecting the two vibrating rod lower sections 16*e* are grouped into two sets. A first set is electrically connected to the vibrating rod lower section 16*e* and the second set is electrically connected to the other vibrating rod lower section 16*e*. Voltage is applied across these two sets to conduct electrical power to the passing liquid 14 and for the required processing.

In other words, in FIG. 16, the odd-numbered vibrating vanes 16*f* and clamp members 16*j* are electrically connected from the upper side with the vibrating rod lower section 16*e* on the right side. However, the vibrating rod lower section 16*e* on the left side is electrically insulated by the insulation bushing 16*s* and insulation washer 16*t*. However, the even-numbered vibrating vanes 16*f* and clamp members 16*j* are electrically connected from the upper side with the left side vibrating rod lower section 16*e* but are electrically insulated from the right side vibrating rod lower section 16*e* by the insulation bushing 16*s* and the insulation washer 16*t*.

The odd-numbered vibrating vanes 16*f* and clamp members 16*j* from the upper side are therefore made the first set; and the even-numbered vibrating vanes 16*f* and clamp members 16*j* from the upper side are made the second set. The electrical wire 127 connecting to the left side of vibrating rod lower section 16*e*, and the electrical wire 127 connecting to the right side of vibrating rod lower section 16*e*, apply the necessary power from the power supply not shown in the drawing. Power can in this way supplied across the first set and second set to the processing liquid 14. The insulation bushing 16*s* and insulation washer 16*t* are omitted from the drawing in FIG. 17.

In this embodiment, the electrical insulation area 16*e*" is installed between the vibration rod 16*e* and the vibration member 16*c* comprising the vibration generating means. In other words, the electrical insulation area 16*e*" in this embodiment also functions as the attachment portion 111 for installing the vibrating rod 16*e* on the vibration member 16*c*.

In this embodiment, when using direct current for applying voltage to the processing liquid 14, the vibrating vane 16*f* forming the anode preferably has a surface of titanium coated with platinum. Preferably titanium is used on the vibrating vane 16*f* forming the cathode.

In this embodiment, power to the vibration-stirring apparatus is only for liquid processing so the apparatus can be made compact. Also the vibrating vanes 16*f* can incorporate the functions of two types of electrodes and so from that viewpoint the device can be made more compact.

Figure 18:
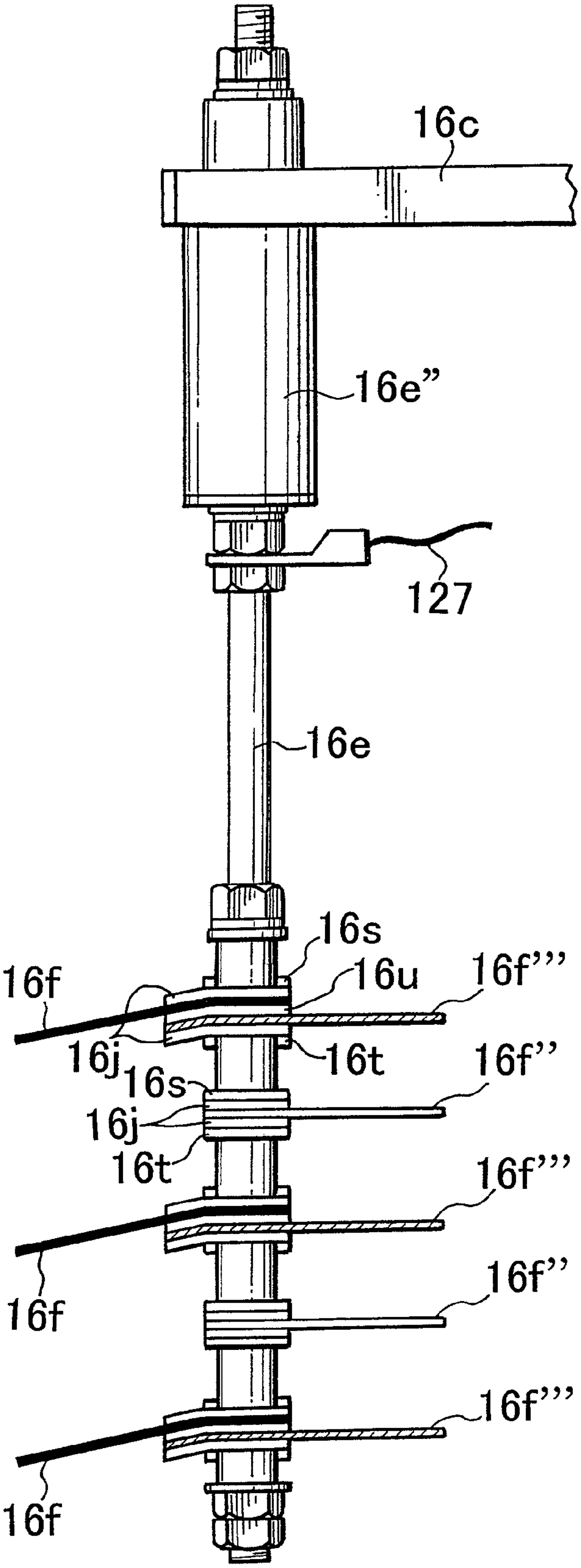
FIG. 18 is a fragmentary side view of the liquid treatment apparatus using the insulated vibration-stirring apparatus of the present invention.

FIG. 18 is a fragmentary side view showing another embodiment of the liquid treatment apparatus using the insulated vibration-stirring apparatus of the present invention.

In this embodiment, an anode member 16*f*" is used instead of the upper side even-numbered vanes 16*f* in the embodiments of FIG. 16 and FIG. 17. This anode member 16*f*" does not contribute to the vibration stir and extends only to the right side of the drawing. The anode member, 16*f*" preferably utilizes lath-webbed titanium (platinum plating on surface). A cathode member 16*f*"' is added by way of the spacers 16*u* as the upper side odd-numbered vanes 16*f*. This cathode member 16*f*"' also does not contribute to the vibration stirring and extends only to the right side of the drawing. Preferably, titanium plate for example is used as the cathode member 16*f*".

In this embodiment, the anode member 16*f*" and cathode member 16*f*" are utilized separate from the vibrating vane 16*f* so there is more freedom in selecting the electrode material.

Figure 19:
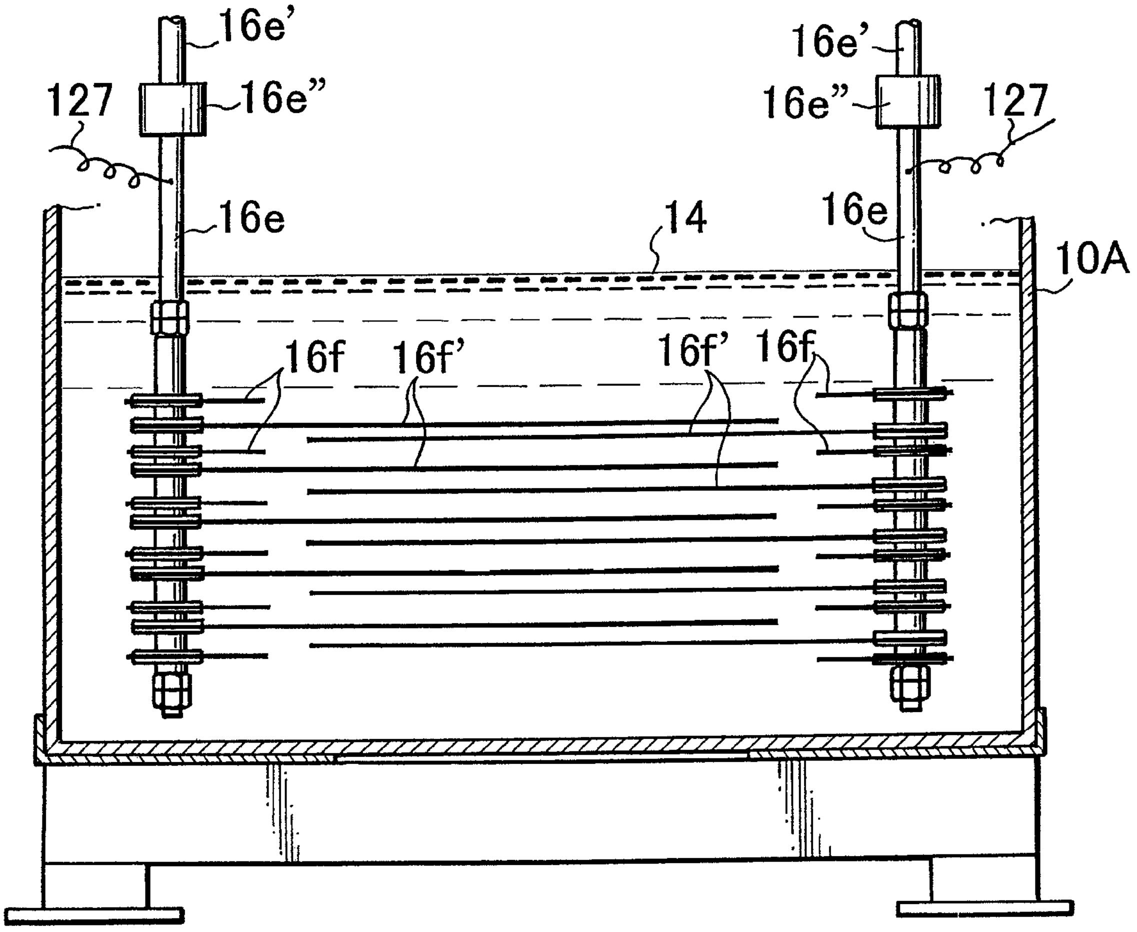
FIG. 19 is a fragmentary cross sectional view of the liquid treatment apparatus using the insulated vibration-stirring apparatus of the present invention.

FIG. 19 is a fragmentary cross sectional view of another embodiment of the liquid treatment apparatus using the insulated vibration-stirring apparatus of the present invention.

In the present embodiment, two insulated vibration-stirring apparatus are installed in the treatment tank 10A. The electrode support vanes 16*f* of one insulated vibration-stirring apparatus are positioned between the electrode support vanes 16*f* of the other adjacent insulated vibration-stirring apparatus. In this way, one of the two insulated vibration-stirring apparatus can be used as the anode and the other used as the cathode. This method allows installing the large size (surface area) anode and cathode in close mutual proximity to each other. This method also allows a drastic improvement in the electrical current density.

Figure 20:
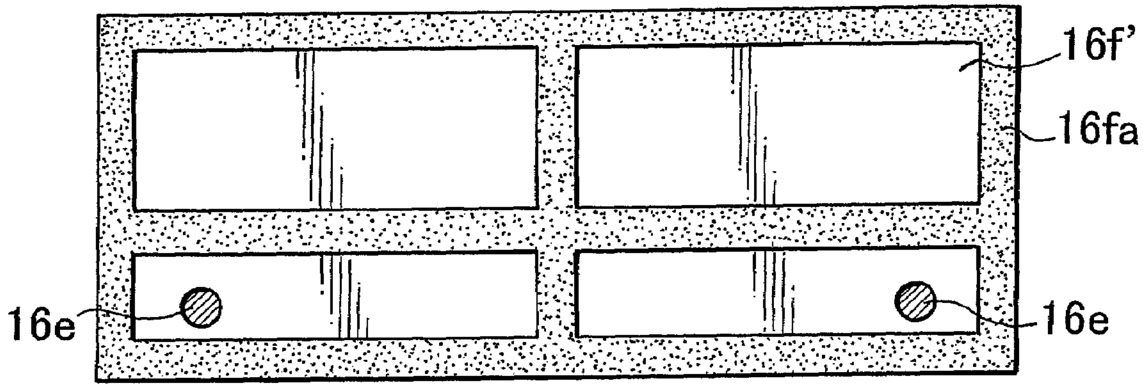
FIG. 20 is a drawing showing the electrode support vanes.

In the present embodiment, insulating tape 16*fa* is preferably affixed to the outer circumferential surfaces on both sides of the electrode support vanes 16*f* as shown in FIG. 20 to prevent electrical shorts from occurring due to contact between the electrode support vanes 16*f* of the two insulated vibration-stirring apparatus.

Figure 33:
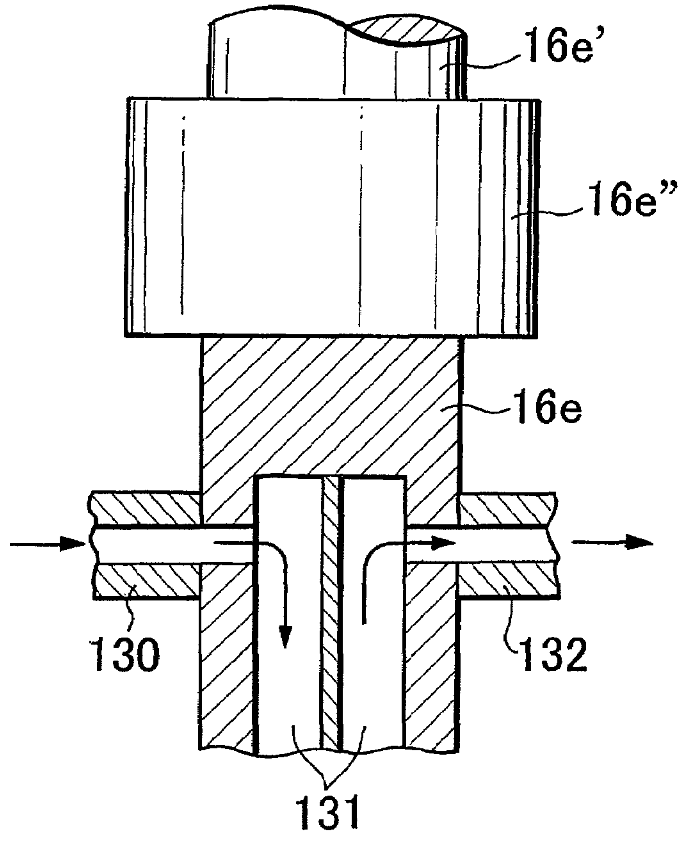
FIG. 33 is a fragmentary cross sectional view of the insulated vibration-stirring apparatus of the present invention.

FIG. 33 is a fragmentary cross sectional view of another embodiment of the insulated vibration-stirring apparatus of the present invention. In the present embodiment, the electrical insulation area 16*e*" is used as a heat insulation area. A heat exchange medium injector section 130 and heat exchange extraction section 132 are installed on the lower side (Namely, the side installed with vibrating vanes not shown the in drawing, using the insulation area 16 as a reference.) of the electrical insulation area 16*e*" on the vibrating rod lower section 16*e*. These heat exchange medium injector section 130 (or injector 130), heat exchange extraction section 132 (or extractor 132) and connected heat exchanger path 131 are installed on this vibrating rod lower section 16*e*. Further, by making the heat exchange medium connect from the injector 130 by way of the heat exchanger path 131 to the extractor 132, the heat insulation effect of the electrical insulation area 16*e*" is rendered whether the processing liquid is a high temperature or a low temperature. The effects of heat on the vibrator generating means including the vibration motor can therefore be prevented.

In this embodiment, when heat insulating by using the insulation area 16*e*" heat insulation dimensions are preferably larger than the dimensions for electrical insulation. A fin-shaped heat dissipation plate can also be formed on the outer circumference of electrical insulation area 16*e*". When the processing liquid is cool (low temperature), a heater can be installed on the vibrating rod lower section 16*e* instead of having a heat exchange medium flow to the path 131.

Next, an embodiment of the surface treatment apparatus of the present invention is shown. Even in the following specific examples, the surface treatment apparatus of this invention can comprise processing liquid from the liquid treatment apparatus of the above embodiments as the processing fluid and also the product for processing can be substituted for one electrode member.

Figure 21:
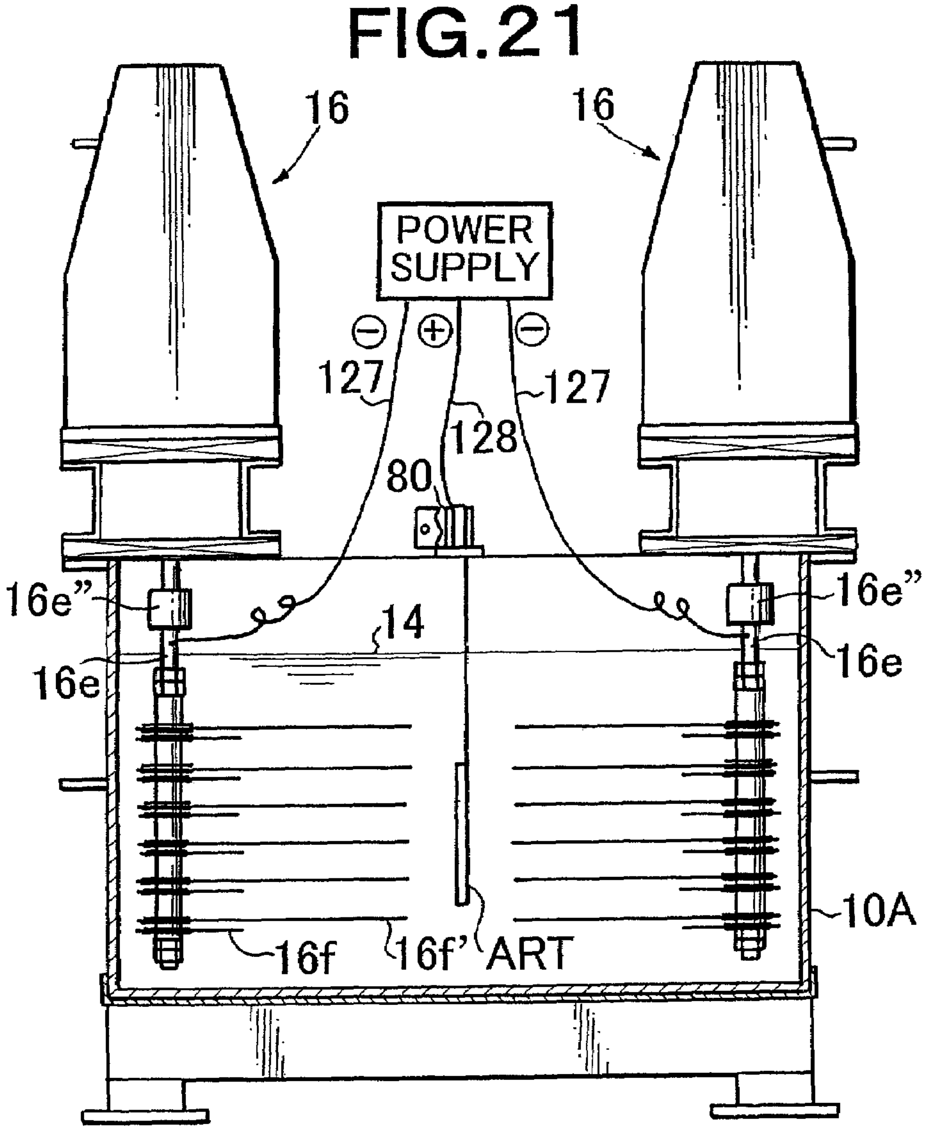
FIG. 21 is a cross sectional view of the surface treatment apparatus using the insulated vibration-stirring apparatus of the present invention.
Figure 22:
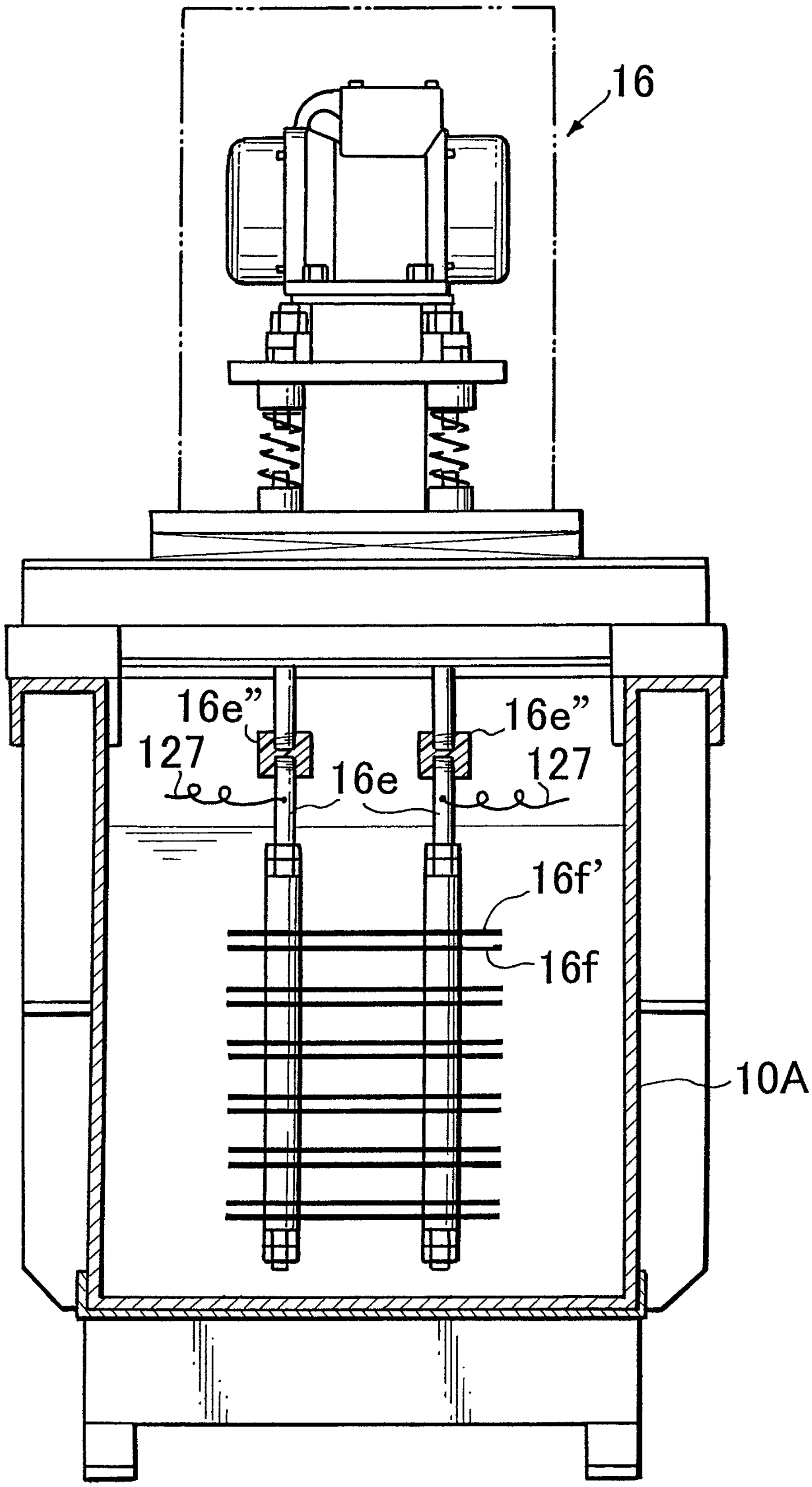
FIG. 22 is a cross sectional view of the surface treatment apparatus using the insulated vibration-stirring apparatus of the present invention.

FIG. 21 and FIG. 22 are cross sectional views of an embodiment of the surface treatment apparatus using the insulated vibration-stirring apparatus of the present invention.

In the present embodiment, insulated vibration-sting apparatus are installed respectively on the both right and left ends of the treatment tank 10A. The above embodiments are utilized for these insulated vibration-stirring apparatus. The electrode support vanes 16*f* in particular are used here. The processing liquid 14 is stored within the treatment tank 10A, and the processing product ART is installed within that processing liquid. This processing product ART is supported while hung from the support means 80 and power can be conducted to it from the support means 80.

When the product for processing is on the anode side such as for anodic oxidation, then an anode bus-bar is used as the support means 80 as shown in the figure. The cathode bus-bar is supplied by the electrical line 128 connecting to the anode of the (processing) power supply. The cathode of the power supply on the other hand, connects by way of an electrical line 127 to the vibrating rod lower sections 16*e* of the two vibration-stirring apparatus. In contrast, when the product for processing is on the cathode side such as during plating, then the cathode bus-bar is used as the support means 80. This cathode bus-bar connects to the cathode of the processing power supply by way of an electrical line 128, and the anode of this power supply connects to the vibrating rod lower sections 16*e* of the two vibration-stirring apparatus by way of the electrical line 127.

The processing power supply need only supply direct current and preferably supplies normal low-ripple direct current.

However power supplies using direct current having other types of waveforms may also be utilized.

Among the various pulse waveforms for example, a rectangular waveform pulse is preferable view of its improved energy efficiency. This type of power supply (power supply apparatus) can create voltages with rectangular waveforms from an AC (alternating current) voltage. This type of power supply further has a rectifier circuit utilizing for example, transistors and is known as a pulse power supply. This power supply or rectifier device may be a transistor regulated power supply, a dropper type power supply, a switching power supply, a silicon rectifier, an SCR type rectifier, a high-frequency rectifier, an inverter digital-controller rectifier device, (for example, the Power Master made by Chuo Seisakusho (Corp.)), the KTS Series made by Sansha Denki (Corp.), the RCV power supply made by Shikoku Denki Co., a means for supplying rectangular pulses by switching transistors on and off and comprised of a switching regulator power supply and transistor switch, a high frequency switching power supply (using diodes to change the alternating current into direct current, and then add a 20 to 30 KHz high frequency waveform, and with power transistors apply transforming, once again rectify the voltage, and extract a smooth (low-ripple) output), a PR type rectifier device, a high-frequency control type high-speed pulse PR power supply (for example, a HiPR Series (Chiyoda Corp.), a thyristor reverse parallel-series connection type, etc.

The current waveforms are now described next. Selection of the current waveform for plating and anodic oxidation is important in order to achieve high-speed plating or anodic oxidation and to improve the characteristics of the plating film or anodic oxidized film. The voltage and current conditions required for electrical plating or anodic oxidizing differ for example, according to the type of anodic oxidation or plating and the composition of the processing liquid (solution) and treatment tank dimension These conditions cannot be limited to specific figures. However, a plating voltage for example of 2 to 15 volts of direct current can cover most conditions. The industry standard for rated power supply output consists of four types: 6 volts, 8 volts, 12 volts and 15 volts. The rated voltage can be adjusted to a lower voltage so preferably a rated power supply is selected that has the voltage value needed for plating with extra capacity. The industry standards for rated output current are approximately 500 amperes, 1,000 amperes, 2,000 amperes up to 10,000 amperes. A production order is made for other voltages. The best strategy is determining the required voltage capacity of the power supply by multiplying the current density of the product to be plated by the surface area of the plated surface of the product to be plated and then selecting a standard power supply that matches this required voltage capacity.

The pulse wave is essentially has a width that is sufficiently small relative to the period. However this is not a strict definition. The pulse waveform also includes waveforms other than square waves. The operating speed of devices using pulse circuits has become faster and pulse widths up to the nanosecond ($10^{-9}$ s) range can be handled. As the pulse width becomes narrower, maintaining a sharp shape on the rising edge and falling edge of the pulse becomes difficult. Maintaining the pulse edges is difficult because the pulse contains high frequency components. The type of pulse waves include sawtooth waves, ramp waves, triangular waves, composite waves, and rectangular waves, (square waves) etc. In the processing in this invention square waves are preferred in particular because of their electrical efficiency and smoothness, etc.

Typical pulse plating power supplies include switching regulator types direct current power supplies and transistor-switched supplies. In the transistor-switched type, the transistors turn on and off at high speed to supply pulses with a rectangular waveform.

Besides direct current electrolysis, anodic oxidation can also use pulse electrolysis. Pulse electrolysis utilizing the current reversal method has many advantages including high-speed, improved film quality, and improved coloring.

The current reversal function is a basic feature of pulse electrolysis power supplies so a set of two pulse supplies are connected together to have mutually opposite polarity. However, the efficiency of this method deteriorates according to usage conditions so applying it to pulse electrolysis using large capacity power supplies in industrial applications is difficult compared to pulse plating. Applying the 3PR type rectifier device however has the advantages of being highly practical because of efficiency, cost, compactness and light-weight, etc.

The pulse electrolysis waveform for the thyristor reverse parallel-series connection type applies the principle of the PR type rectifier with reverse-parallel connected thyristors. The output voltage waveform is therefore the same as the thyristor rectifier device. The normal power conduction ratio is electronically controlling the waveform ripple frequency by the pulse string and so can be variably set to approximately 3.3 milliseconds in the 50 Hertz band or 2.8 milliseconds in the 60 Hertz band.

The processing product ART is maintained at a distance of 20 to 400 millimeters from the tip of the electrode support vane 16*f*. The main surface (both sides of the plate member) to be processed is installed to face the tip of the electrode support vane 16*f*.

In the processing in this embodiment, the product ART serves as one electrode. The vibrating vane 16*f* and electrode support vane 16*f* electrically connected to the vibrating rod lower section 16*e* of the insulated vibration-stirring apparatus serve as the other electrode. Therefore, gas bubbles generated by gas on the electrode surface or adhering to it can be speedily removed by the flow motion of the processing liquid 14 based on the vibration-stirring action of the vibrating vanes 16*f*. The electrical current efficiency is therefore improved and an electrical reaction can be fully boosted in the processing fluid.

In this variation of the embodiment, yet another electrode member (for example, the metal to be plated during plating processing) can also be jointly utilized as the other electrode. In these cases, the electrode member to be used is connected to the power supply to have the same polarity as the insulated vibration-stirring apparatus. In this way, the specified desired amount of current can be maintained and the service life of the vibrating vane and electrode support vane can be lengthened. Also in this variation, an ordinary vibration stirring apparatus can be used instead of the insulated vibration-stirring apparatus (or without the vibrating rod of the insulated vibration-stirring apparatus connecting to the power supply), the other electrode can be utilized exclusively for the electrode member. A variation of this type can be used in the same in the following embodiment.

Figure 23:
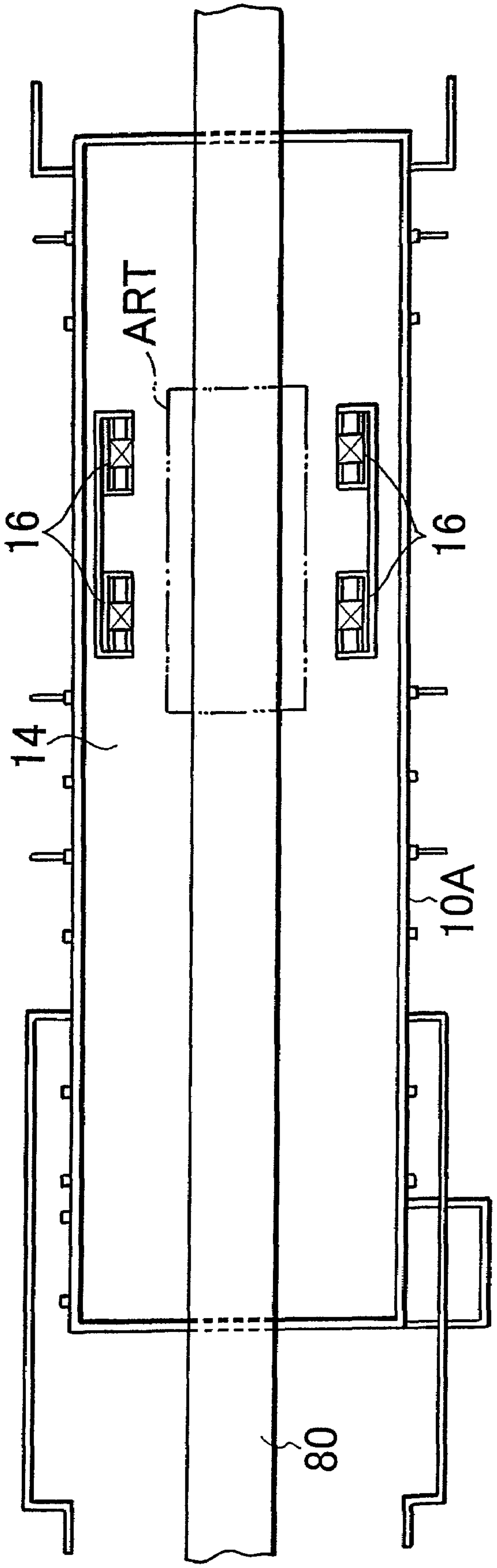
FIG. 23 is a flat view of the surface treatment apparatus using the insulated vibration-stirring apparatus of the present invention.

FIG. 23 is a flat view showing the structure of the surface treatment apparatus for the insulated vibration-stirring apparatus using the present invention. This embodiment is for example applicable to processing of electrodeposition paint (pigment).

In FIG. 23, the liquid electrodeposition paint/coating constituting the processing liquid 14 is stored inside the treatment tank 10A. The product support means 80 constituted by the suspension conveyor is installed on the treatment tank 10A. A processing product ART such as an automotive component is hung from the hanger comprising that support means 80. The processing product ART is immersed in the processing liquid 14 in the treatment tank 10A. Two insulated vibration-stirring apparatus 16, the same as described in the above embodiment are installed on both sides of the movement path of the processing product ART. In the present embodiment, the two insulated vibration-stirring apparatus 16 are installed on one side, at positions corresponding to the dimensions of the processing product ART. In other words, the present embodiment is equivalent to the embodiments for FIG. 21 and FIG. 22 with two units having a common treatment tank.

The power supply for the electrodeposition coating applies a voltage across the hanger of the support means 80 and the insulated vibration-stirring apparatus 16 to perform electrodeposition coating. The non-processing product ART is maintained at a distance from 20 to 400 millimeters from the tip of the electrode support vane 16*f*.

Figure 24:
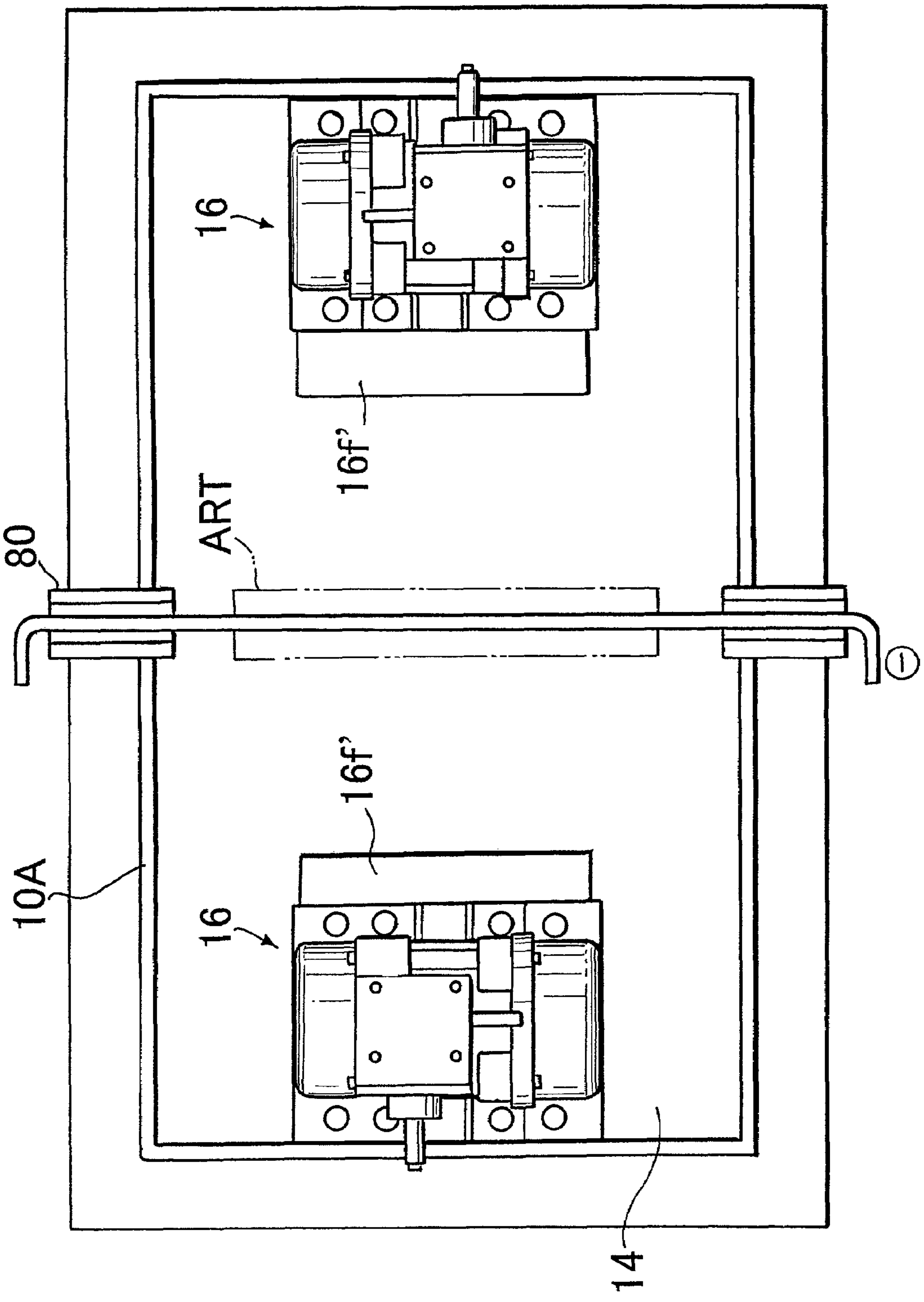
FIG. 24 is a flat view of the surface treatment apparatus using the insulated vibration-stirring apparatus of the present invention.

FIG. 24 is a flat view of another embodiment of the surface treatment apparatus using the insulated vibration-stirring apparatus of the present invention. This embodiment is used for example for electrodeposition coating. This embodiment is basically the same as the embodiments of FIG. 21 and FIG. 22 (The drawing shows that only the polarity of the voltage applied to the processing product ART is different. However this polarity is set as needed to match the type of processing.). In the electrodeposition processing, a voltage of a different polarity is applied to the processing product ART according to the anion electrodeposition device or cation electrodeposition device. In the present invention, the cation electrodeposition device is particularly preferred for use on the anode side of the insulated vibration-stirring apparatus 16.

Figure 25:
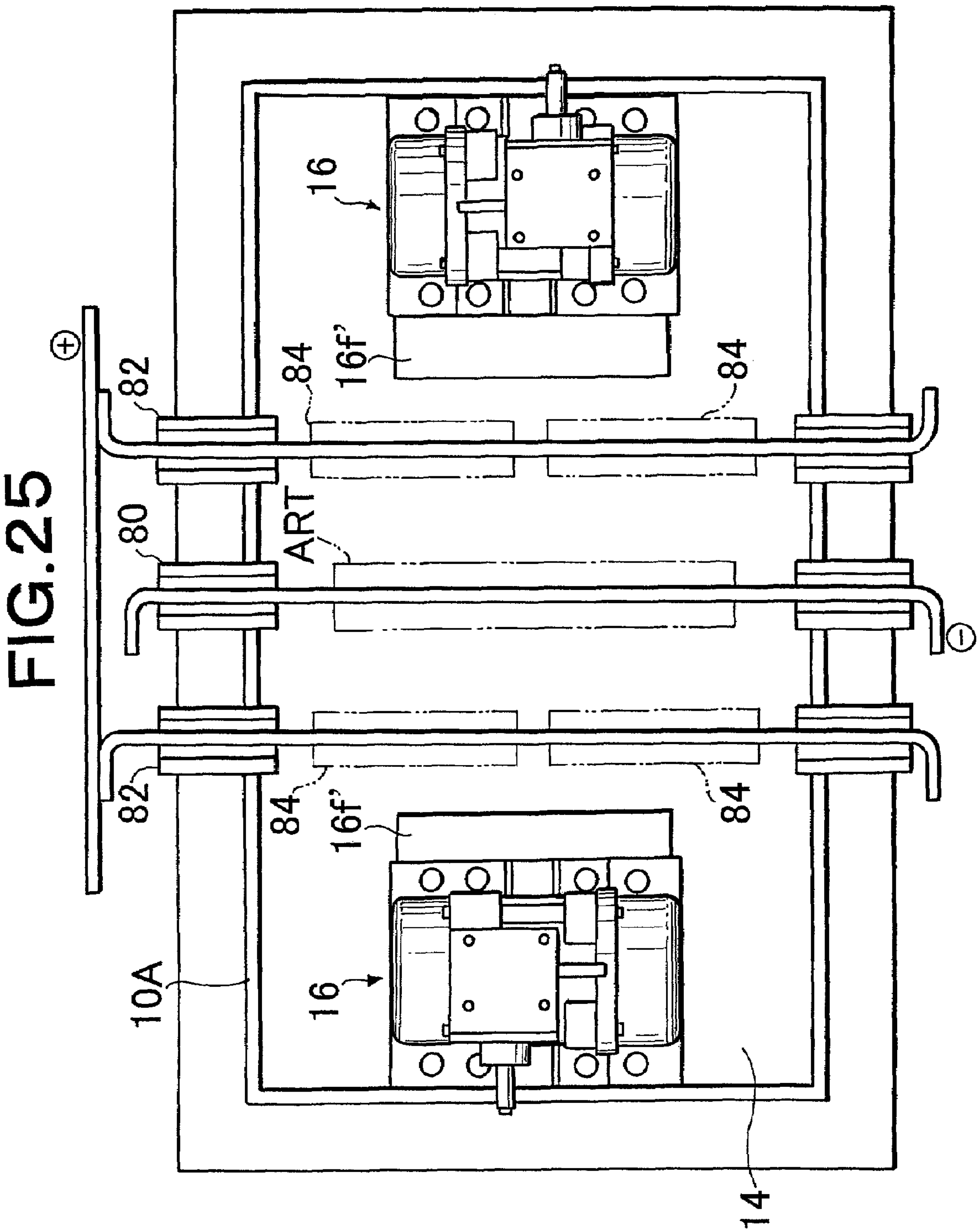
FIG. 25 is a flat view of the surface treatment apparatus using the insulated vibration-stirring apparatus of the present invention.

FIG. 25 is a flat view of another embodiment of the surface treatment apparatus for the insulated vibration-stirring apparatus of the present invention. This embodiment is used for example for electrodeposition coating.

Figure 26:
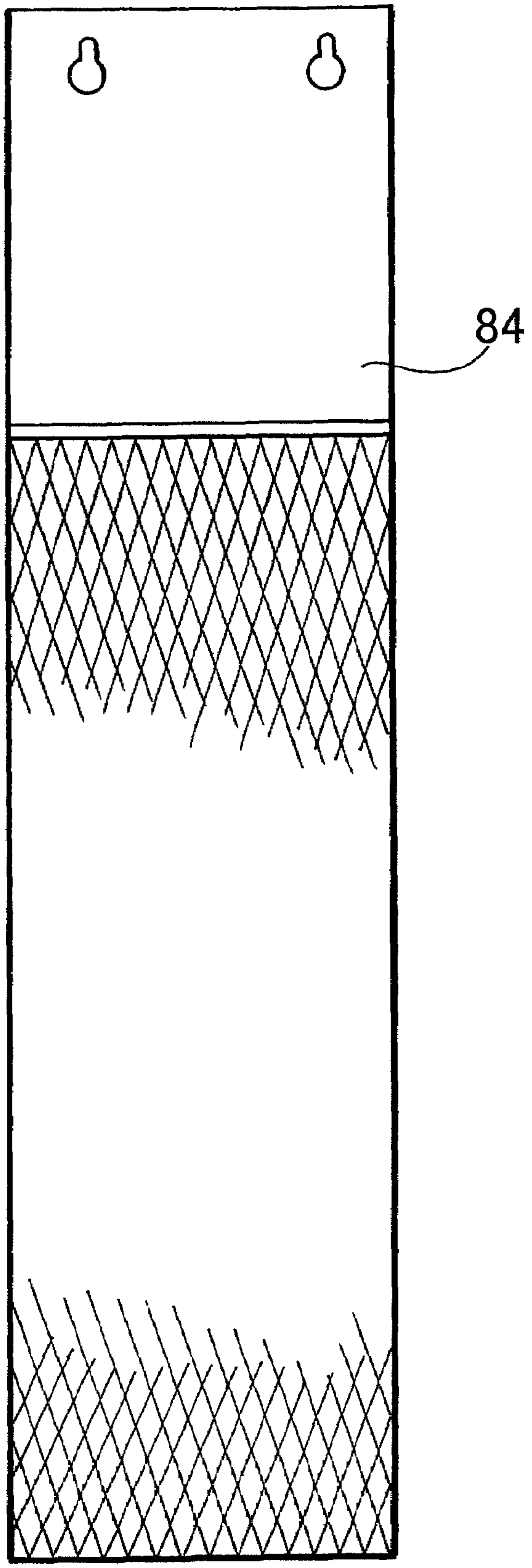
FIG. 26 is a frontal view of the electrode support member.

The present embodiment is equivalent to the embodiment of FIG. 24 added with a support means 82 for an electrode member 84 applied with voltage of the same polarity as the insulated vibration-stirring apparatus 16. The support means 80 for the processing product ART is for example a cathode bus-bar. The support means 82 for the electrode member 84 is for example an anode bus-bar. The electrode member 84 is for example a lath-webbed titanium (preferably with platinum deposited on the surface) electrode member. FIG. 26 is a frontal view of the lath web electrode support member. Two suspension holes are formed in the upper section for hanging. The area from the center section to the lower section is formed in a web shape. This web shape is immersed in the processing liquid. The electrode member 84 is installed in parallel with the processing product ART and installed between the insulated vibration-stirring apparatus 16 and processing product ART.

Figure 27:
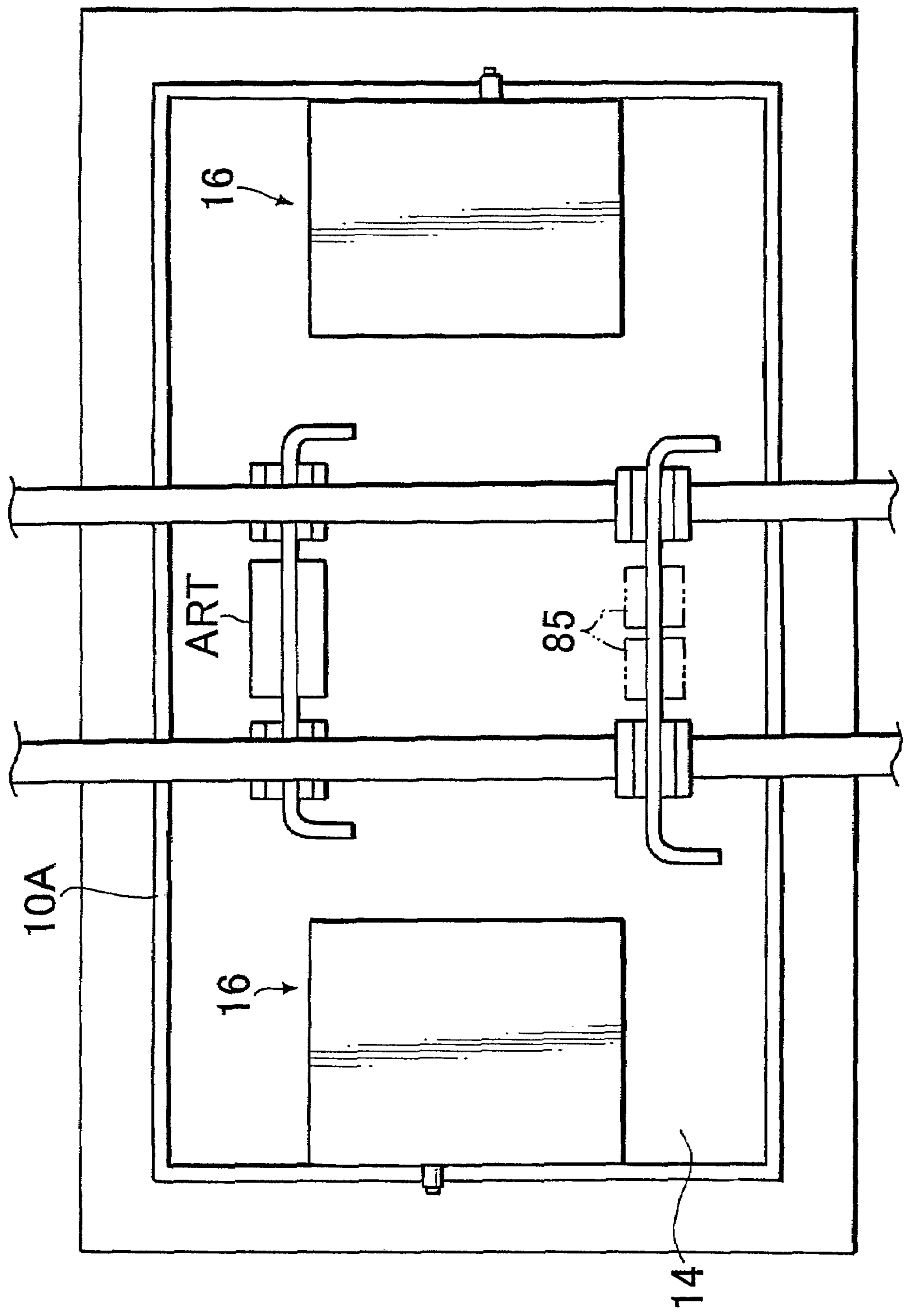
FIG. 27 is a flat view showing for reference, a structure of the surface treatment apparatus using the vibration-stirring apparatus.

FIG. 27 is a flat view showing for reference, the structure of the surface treatment apparatus using the vibration-stirring apparatus. In this example, the vibration string apparatus is not the insulated type. The processing product ART and the electrode member 85 are mutually installed in parallel but are not installed facing the vibration-stirring apparatus 16.

Figure 28:
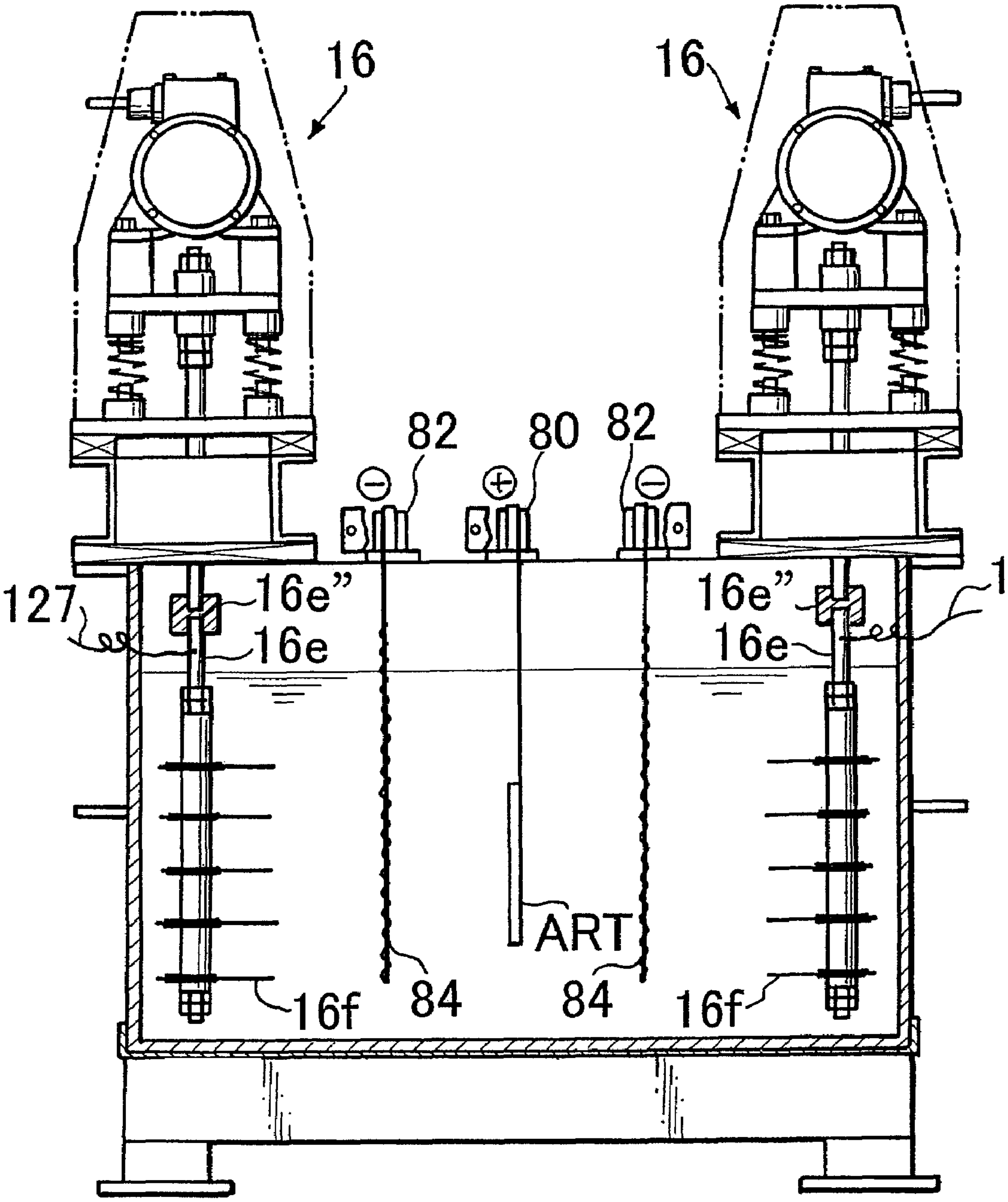
FIG. 28 is a cross sectional view of the surface treatment apparatus using the insulated vibration-stirring apparatus of the present invention.

FIG. 28 is a cross sectional view of another embodiment of the surface treatment apparatus using the insulated vibration-stirring apparatus of the present invention. This embodiment is used for example in anodic oxidation processing. The present embodiment is basically equivalent to the embodiments of FIG. 21 and FIG. 22 added with a support means 82 for an electrode member 84 applied with voltage of the same polarity as the insulated vibration-sting apparatus 16. However, electrode support vane are not used. The support means 80 for the processing product ART is for example an anode bus-bar. The electrode member 84 comprising the support means 82 is for example an anode bus-bar. This support means 82 for electrode member 84 is for example a titanium lath web electrode member.

Figure 29:
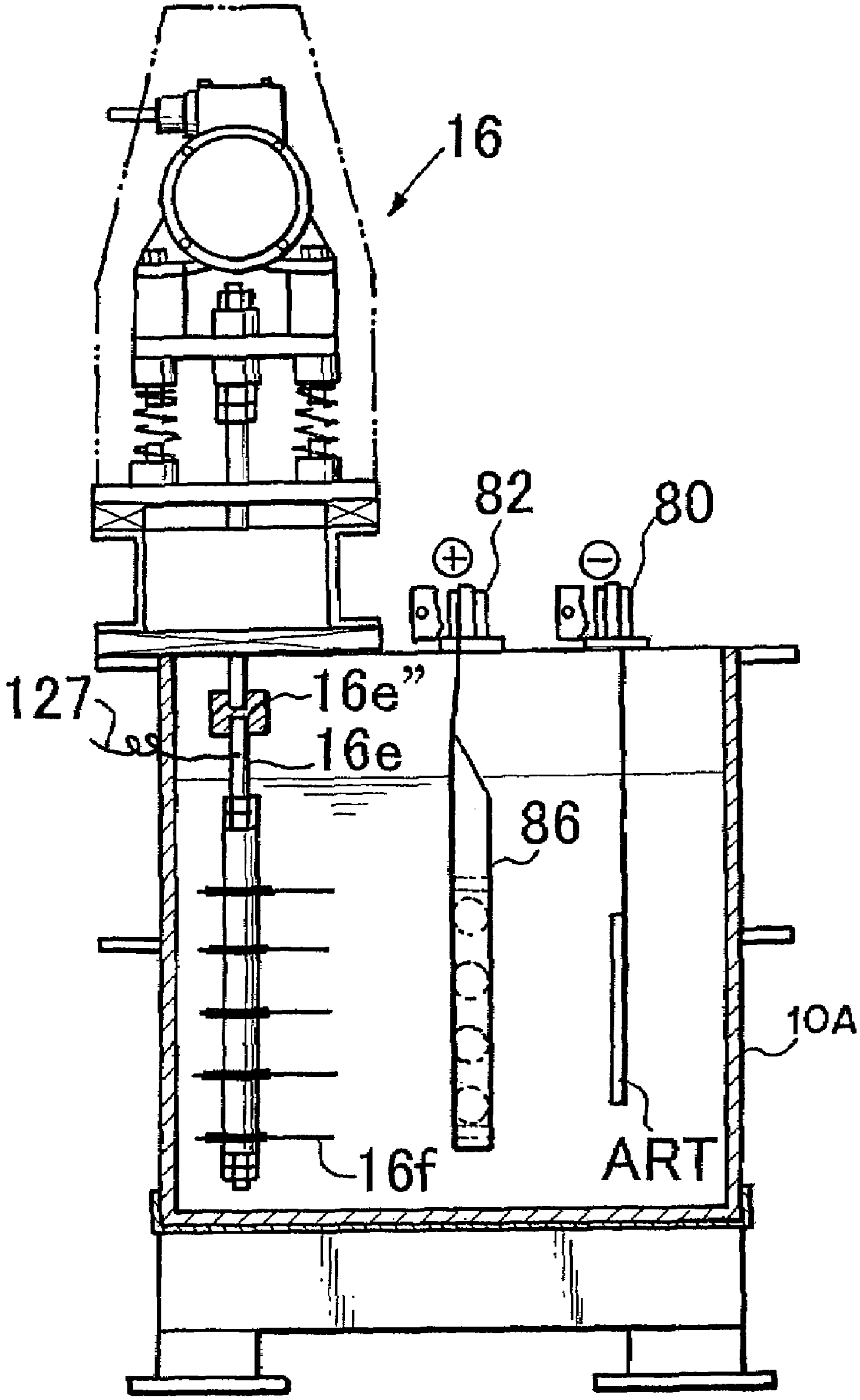
FIG. 29 is a cross sectional view of the surface treatment apparatus using the insulated vibration-stirring apparatus of the present invention.
Figure 30:
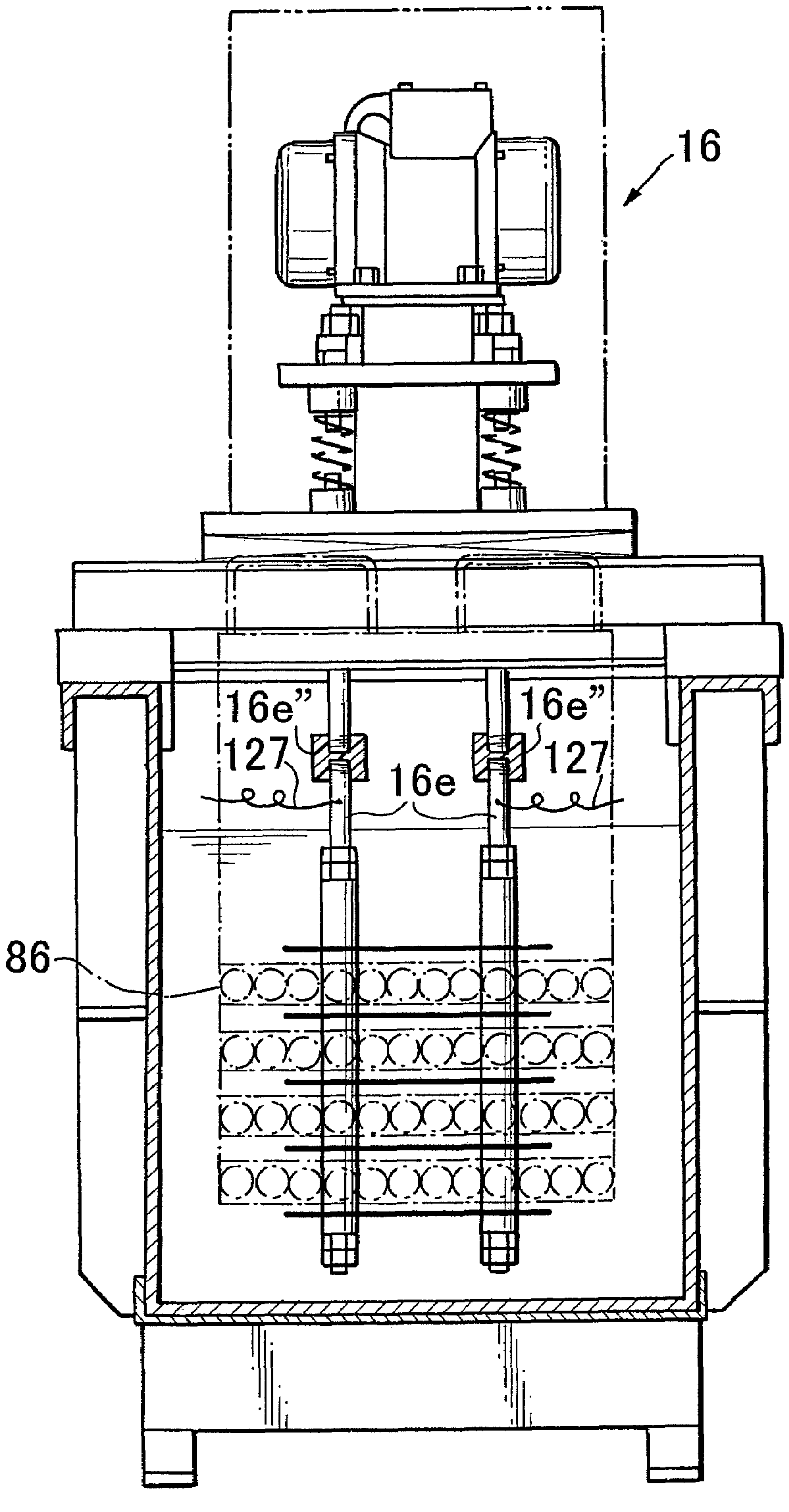
FIG. 30 is a cross sectional view of the surface treatment apparatus using the insulated vibration-stirring apparatus of the present invention.
Figure 31:
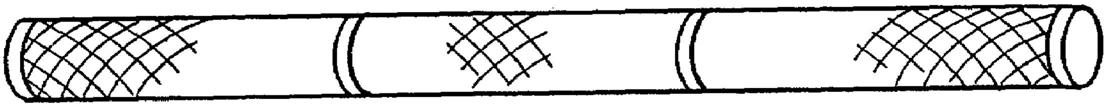
FIG. 31 is a perspective view of the cylindrical titanium net case configuring the electrode member.

FIG. 29 and FIG. 30 are cross sectional views showing the structure of the surface treatment apparatus using the insulated vibration-stirring apparatus of the present invention. This embodiment is applicable for example to processing by electroform plating. This embodiment is basically equivalent to the embodiment of FIG. 25 with the insulated vibration-stirring apparatus and electrode member removed on the fight side of the processing product ART. Electrode support vanes however are not utilized in this embodiment. Also, multiple metal balls (nickel balls, copper balls, etc.) fill the inside of the cylindrical titanium web case as shown in FIG. 31 are used as the electrode member 86. The case is maintained to face horizontally.

Figure 32:
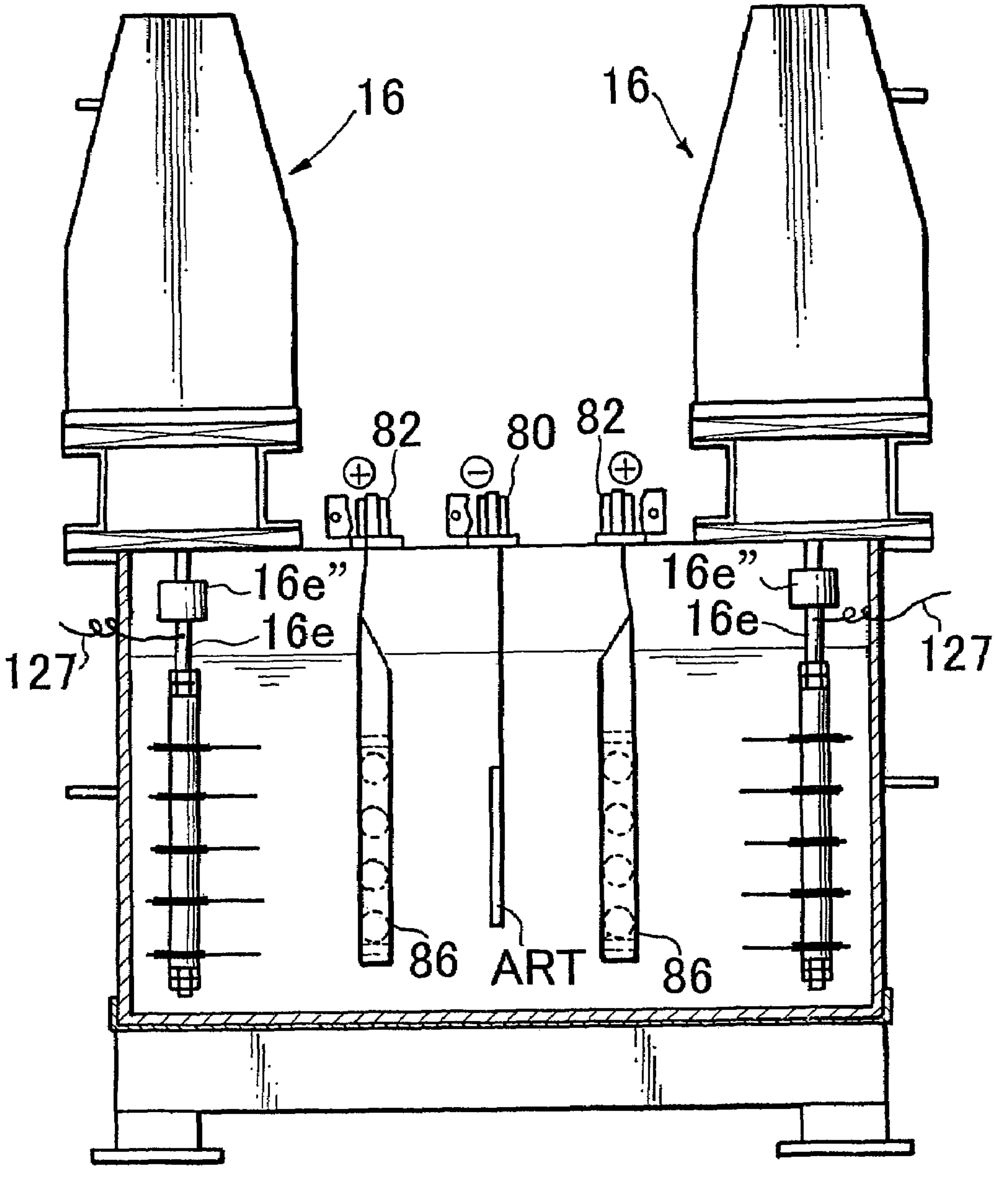
FIG. 32 is a cross sectional view of the surface treatment apparatus using the insulated vibration-stirring apparatus of the present invention.

FIG. 32 is a cross sectional view showing the structure of another embodiment of the surface treatment apparatus using the insulated vibration-stirring apparatus of the present invention. This embodiment is used for example for plating processing. This embodiment is basically the same as the embodiment of FIG. 25. However, the electrode member identical to the embodiments of FIG. 29 and FIG. 30 is utilized as the elect rode member 86.

In the respective liquid treatment apparatus of FIG. 1, FIG. 9, FIG. 13, and FIG. 14, the product for processing held by the support means is connected to the electrical line 128 and that product for processing is used as one electrode. By then immersing this product in the processing liquid 14, the liquid treatment apparatus of these embodiments can be utilized as surface treatment apparatus for the product.

The present invention is described next with the following embodiments. The present invention however is not limited to these embodiments.

First Embodiment

Milk Sterilizer

Milk was sterilized using the liquid treatment apparatus described for FIG. 34. The processing conditions were as follows.

Insulated vibration-stirring apparatus: is installed on both sides of the inner tank member 61 of FIG. 34 as described in FIG. 16 and FIG. 17.

Vibration motor: 200 volts (3-phase)×150 watts, vibration frequency: 42 Hertz

Vibrating vane: Cathode side is titanium. Anode side is platinum plating on the titanium surface.

Processing power supply voltage: 4.5 volts

Processing current: 3.5 amperes

Treatment tank: W300×L700×H350 millimeters

Processing fluid: Using a tryptiquese growth medium the intestinal bacteria (colon bacillus) was cultured for 24 hours at 35° C. After propagation, a turbid bacteria medium of 60 liters of milk within the treatment tank "contained 22,000 colon bacillus per liter of milk".

After irradiating with ultraviolet light, conducting power and vibration-stirring (agitation), the results as shown in the following table 1 were obtained.

TABLE 1

| Processing time | Living colon *bacillus* per liter |
|---|---|
| 3 minutes | 30 or less per milliliter |
| 5 minutes | 30 or less per milliliter |
| 10 minutes | None detected |

To measure the living bacteria, 40 milliliters of processed milk was extracted from 4 locations within the treatment tank as samples for measurement. These were measured by the viable count method and pour plate method.

Second Embodiment

Electrodeposition Painting

Cation electrodeposition coating of automotive parts was performed using the insulated vibration-stirring apparatus described in FIG. 21 and FIG. 22, as the insulated vibration-stirring apparatus 16 for the surface treatment apparatus (electrodeposition coating device) described in FIG. 23.

A tank made of steel with an inner lining of plastic was used as the treatment tank (electrodeposition tank) 10A. A processing liquid 14 (liquefied electrodeposition coating) consisting of synthetic fatty soluble emulsion, pigment paste, and water was filled into this tank A negative electrode hanger was affixed to the electrically insulated suspension conveyor 80 in the tank. The automotive part (processing product ART) was hung from it and used as the negative electrode. As shown in FIG. 21 and FIG. 22, the insulated vibration-stirring apparatus contains two vibrating rods and, a vibrating vane of titanium plated with platinum (thickness 0.5 mm, $D_1$=250 mm and $D_2$=55 mm as shown in FIG. 12, a tilt angle $\alpha$=15 degrees as shown in FIG. 11) and an electrode vane of titanium plated with platinum (thickness equivalent to 0.5 mm, $D_1$=250 mm and $D_2$=150 mm as shown in FIG. 12, a tilt angle $\alpha$=15 degrees as shown in FIG. 11) connected to the positive electrode. These vibrating vanes were vibrated at 45 Hertz by a vibrating motor at an amplitude (vane width) of 2 mm, and number of vibration of 1500 times per minute. A total of four insulated vibration-stirring apparatus 16 are installed as shown in FIG. 23 with two units each facing each other while enclosing the processing product ART.

The insulated vibration-stirring apparatus utilizes 200 volts, three-phase vibration motors of 250 watts. Cylindrical material of hard polyurethane as described in FIG. 5 through FIG. 7 was utilized for the electrical insulation area on the vibrating rod.

Electricity conducted to the vibrating rods was 250 volts by way of an inverter and an electrical current density of 20 A/dm$^2$. The minimum gap between the tip of the electrode support vane and the automotive part was set at 100 millimeters. The immersion time that the automotive part was in the liquid electrodeposition pigment (coating) was 3 minutes.

An electrodeposition coating film of approximately 40 micrometers was obtained as a result of this process.

In the comparison sample on the other hand, electricity was not conducted to the vibrating rod. A set of four electrode plates were positioned at nearly the same distance as from the automotive part to the vibrating rod and electricity was conducted to the electrode plates. Further, the immersion time was six minutes and the coating thickness was 20 micrometers when the vibration stirring apparatus was driven and electrodeposition coating performed.

Consequently the above shows that applying electricity to the vibrating rods shortened the electrodeposition time by approximately one-fourth.

Third Embodiment

Electrodeposition Coating

The insulated vibration-stirring apparatus of the third embodiment does not use electrode support vanes. The vibrating vane have a thickness of 0.5 millimeters, $D_1$=250 mm and $D_2$=170 mm as shown in FIG. 12 and a tilt angle $\alpha$=15 degrees as shown in FIG. 11. A titanium lath web electrode plate (electrode member) with platinum plating was inserted between all insulated vibration-stirring apparatus and automotive part as described using FIG. 26. These electrode plates were anodes of the same polarity utilizing vibrating rods and vibrating vanes of the vibration-stirring apparatus. The gap between the tip of the vibrating vane and the lath web electrode plate was 50 millimeters. The minimum distance between the lath web electrode plate and automotive part was 100 millimeters. In other words, the positional relationship of the insulated vibration-stirring apparatus, the lath web electrode plate and the processed part was the same as shown in FIG. 28.

Electrodes having the same polarity can in this way be installed instead of using electrode support vanes. Results obtained were similar to those of the second embodiment.

Fourth Embodiment

Electrodeposition Coating

The fourth embodiment utilizes the same insulated vibration-stirring apparatus as the third embodiment. Here, anion electrodeposition coating of the automotive part was performed as described for the surface treatment apparatus (electrodeposition coating apparatus) described in FIG. 23. In a treatment tank made of iron, a copolymer of linseed oil and maleic acid was neutralized with ethanol amino. Water and a solvent comprised of cellosolve acetate butylate was added, and an anion electrodeposition coating adjusted to a non-volatile portion of 10 percent was also added. The automotive part used as the anode was hung from the suspension conveyor. The treatment tank constituted the anode (positive electrode) and the insulated vibration-stirring apparatus served as the cathode (negative electrode). The gap between the tip of the vibrating vanes of the insulated vibration-stirring apparatus serving as the cathode and the automotive part serving as the anode was set at 100 millimeters. A lath web electrode plate (See FIG. 26; thickness 3.0 millimeters, web portion thickness 1.5 millimeters, one mesh opening angle length of 10 millimeters, and other angle length of 20 millimeters) of titanium was installed on the side opposite the automotive part of the insulated vibration-stirring apparatus. The gap between the rear end of the vibrating vane of the insulated vibration-stirring apparatus and the lath web electrode plate was 50 millimeters (In other words, a distance of 50 millimeters between the lath web electrode plate and edge of side opposite the tip of the vibrating vane facing the automotive part.). The gap between the lath web electrode plate and treatment tank was set at 100 millimeters.

The vibration motors of the insulated vibration-stirring apparatus were driven at 45 Hertz by an inverter. The vibrating vanes had an amplitude (vibration width) of 2 millimeters and were made to vibrate at a frequency of 1,800 times per minute. A direct current voltage of 200 volts was applied across the cathode and anode (positive and negative electrodes) by the power supply and electrodeposition coating performed at room temperature. Electrodeposit coating was performed at an electrical current density of 10 A/dm$^2$ applied in the first stage for one minute, and an electrical current density of 15 A/dm$^2$ applied in the second stage for one minute. When the product with the electrodeposited coating obtained in this way was sintered at 160° C. after washing, an electrodeposit coating 30 micrometers thick and superior resistance to rust was obtained.

Fifth Embodiment

Electrodeposition Coating

The installation of the fourth embodiment had the configuration of automotive part—insulated vibration-stirring apparatus—titanium lath web electrode plate—electrodeposition tank. However the present embodiment has the configuration of automotive part—stainless steel web electrode plate (electrode member)—insulated vibration-stirring apparatus—electrodeposition tank. The gap between the automotive product and the stainless steel web electrode plate is 100 millimeters. The gap between the stainless steel web electrode plate and vibrating vane front edge is 50 millimeters. The gap between the vibrating vane rear end and electrodeposition tank is 100 millimeters.

Though the processing results from this embodiment were somewhat inferior to those of the fourth embodiment, the results were largely satisfactory.

Sixth Embodiment

Electrodeposition Coating

The insulated vibration-stirring apparatus shown in FIG. 14 was utilized. The small part serving as the product for processing was placed in a narrow rotating basket (plastic barrel). The narrow rotating basket periphery was installed facing the vibrating vane. The gap between the vibrating vane and rotating basket was 100 millimeters. The vibrating vane was of stainless steel and had a thickness of 0.5 millimeters and a $D_1$=250 mm and $D_2$=170 millimeters as shown in FIG. 12.

A liquid electrodeposition paint material including alkyd resin water-soluble plastic emulsion, pigment paste, water and other materials is filled into the tank. The product for processing in the interior of the rotating basket is the cathode (negative electrode) and the vibrating vane is the anode (positive electrode) and cation electrodeposition painting/coating is performed. The electrical current density in this processing was 15 A/dm$^2$.

Speedy and uniform electrodeposition coating/painting of the small part without flaws can in this way be achieved.

Seventh Embodiment

Electrodeposition Coating

In this embodiment, the following processes (1) through (4) were performed as preprocessing on a one meter square steel plate (1) Degreasing: Using the vibration-stirring apparatus (vibration motor with frequency of 40 Hertz), degreasing processing was performed for two minutes at 50 to 60° C. using a weak alkali degreasing fluid.

(2) Washing: Using the vibration-stirring apparatus (vibration motor with frequency of 40 Hertz) processing was performed with water for two minutes at 40 to 50° C.

(3) Distilled water washing: Processing was performed for two minutes with deionized water at room temperature and a resistance of 5×10$^5$ ohms or more.

(4) Water cutoff-air drying Processing performed for 5 minutes at 130 to 140° C. and the following electrodeposition coating was performed on the steel plate obtained from the preprocessing.

Electrodeposition tank: Steel lined tank (600 liters of liquid)

Electrodeposition material: Water-soluble primer type emulsion paint neutralized with epoxy adduct of grade 4 amino.

liquid temperature: 30° C.

Type and installation of vibration-stirring apparatus:

(a) A 150 watt×200 volt (three-phase) insulated vibration-stirring apparatus (vibrating vane [titanium with platinum coating)] and electrode support vane [titanium with platinum coating)] and processing product were installed as shown in FIG. 25. The distance from the tip of the electrode support vane to the steel plate serving as the processing product was 100 millimeters. The processing product was the cathode (negative electrode) and the vibrating vanes and electrode support vanes of the insulated vibration-stirring apparatus were the anode (positive electrode). Using a rectifier device, 150 volts was applied and the electrical current density was 30 A/dm$^2$.

(b) Here, a titanium lath web electrode plate (of FIG. 26) with platinum plating was installed between the insulated vibration-stirring apparatus of (a) and processing product as shown in FIG. 25. The gap between the steel plate comprising the processing product and the lath web electrode plate was 100 millimeters. The gap between the lath web electrode plate and tip of the electrode support vane of the insulated vibration-stirring apparatus was 50 millimeters. The processing product was the cathode (negative electrode) and the lath web electrode plate and vibrating vanes and electrode support vanes were the anode (positive electrode). Using a rectifier device, 150 volts was applied and the electrical current density was 30 A/dm$^2$.

Figure 4:
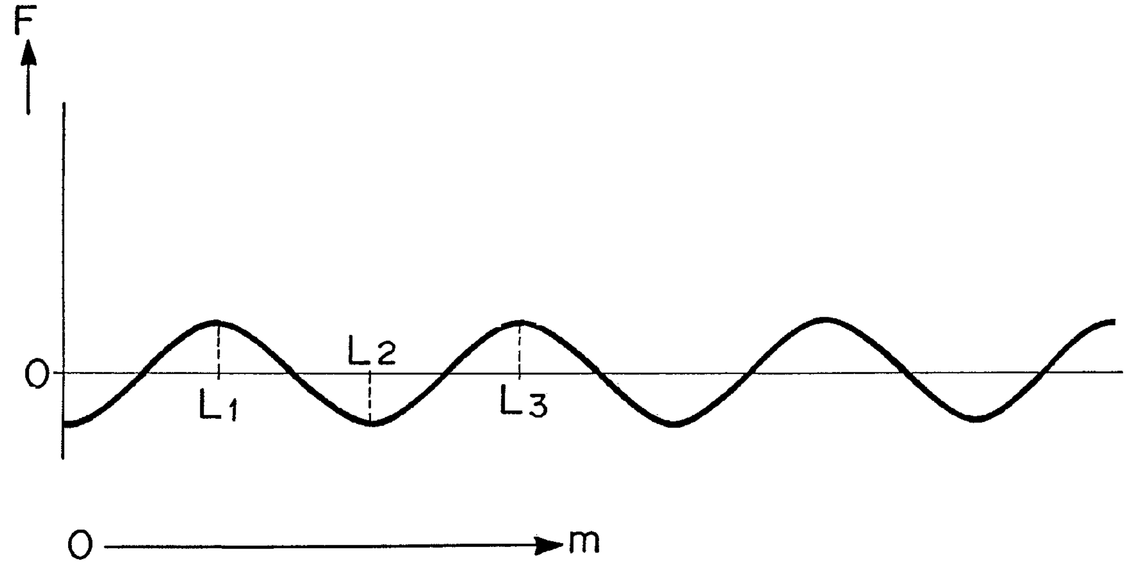
FIG. 4 is a graph showing the relation of the vibration height of the vibrating vane to the vibrating vane vertical direction.

(c) This configuration is for comparison purposes. The processing product and electrode member and vibration-stirring apparatus were installed as shown in FIG. 27. In this installation, the steel plate comprising the processing product and the electrode member were facing each other but the vibrating vanes of the vibration-stirring apparatus were installed at a right angle to them, regardless of how the processing product and electrode member were facing. In the conventional type stirring apparatus, only the efficient agitation (mixing) was the number one priority. No thought was given to placing the vibrating vanes close to the processing product or installing the vibrating vanes and processing product to face each other. Rather the vibration-stirring apparatus was installed at a position as far away as possible from the processing product and the processing product and electrode member were installed at a right angle to the vibrating vane so as not to interfere with the flow of the fluid. Unlike the installations of (a) and (b) however, in this installation there is no need for a metal web-shaped electrode member. Also, the vibration apparatus need not be an insulated type. Here, the gap between the processing product and electrode member was 400 millimeters. The vibrating vane was stainless steel, the thickness was 0.4 millimeters and $D_1$=180 mm and $D_2$=50 millimeters as shown in FIG. 12 (length shown by first peak in FIG. 4). The processing product was the cathode (negative electrode) and the electrode member was the anode (positive electrode). The electrical current density was 3 A/$dm^2$.

Electrodeposition painting/coating was performed at a temperature of 30° C. in all of the above systems (a), (b) and (c). Results obtained from electrodeposition of these sample plates are shown in Table 2. The vibration-sting apparatus was used both the preprocessing and postprocessing for the electrodeposition painting/coating.

TABLE 2

| | (a) | (b) | (c) |
|---|---|---|---|
| Coating time (min.) | 1 | 1 | 3 |
| Electro-deposited film thickness (μm) | 25 ± 1 | 25 ± 1 | 25 ± 3 |
| Appearance Satisfactory | Satisfactory | Satisfactory | A few gas holes |
| Salt-water spray test | OK after 200 hours | OK after 200 hours | Rust occurred after 96 hours |
| Durability test | No abnormalities after 700 hours | No abnormalities after 700 hours | Rust occurred after 96 hours |

Remarks)

Salt-water spray test: JIS-K-5400 Cut off a sample test piece, seal the periphery, make an X cut mark.

Durability test (with Weatherow meter): JIS-K-5400 Cut off a sample test piece and seal the periphery.

Eighth Embodiment

Anodic Oxidation

Anodic oxidation generally has the problem that the time required is too long compared to the pre and postprocesses.

Therefore in this eighth embodiment, the apparatus shown in FIG. 21 and FIG. 22 were used. The insulated vibrating apparatus used here is described as below.

Vibration motor: 200 volts (3-phase)×150 watts,
vibration frequency: 50 Hertz

Vibrating vane: Six vanes made of titanium, the thickness was 0.4 millimeters and $D_1$=180 mm and $D_2$=150 millimeters as shown in FIG. 12 (length shown by second peak in FIG. 4).

Electrode support vane: Five vanes made of titanium.

An aluminum piece (#2017) with dimensions of 100×100×2 mm was utilized as the processing product. The processing liquid was adjusted using sulfur as the chemical (200 grams per liter) and general-purpose alamite [embodiment 7-1] and hard alamite [embodiment 7-2] were formed.

As comparison samples, general-purpose alamite and hard alamite were formed in layout of FIG. 27 using a conventional type vibration-stirring apparatus that was not the insulated type.

The anodic oxidation processing conditions and results obtained are shown in Table 3 and Table 4.

TABLE 3

| | Embodiment 7-1 | Comparison sample |
|---|---|---|
| Voltage [V] | 19 | 19 |
| Temperature [° C.] | 21 | 21 |
| Electrical current density [A/$dm^2$] | 30 | 4 |
| Processing time [min.] | 3 | 30 |
| Film thickness [μm] | 24 | 27 |
| Hardness [HV] | 350 | 250 |
| Appearance | No microporosity | Slight microporosity |
| Anti-rust test [h] | 86 | 48 |
| Luster | Satisfactory | Deterioration |

Remarks)
Film thickness test: JIS-H-8680 Eddy current measurement
Hardness pass/fail: JIS-H-8882 Vickers hardness meter (HV)
Anti-rust test: Alamite JIS-K-5400
Salt-water spray test (white rust)
Hardness alamite: JIS-H-8681
Corrosion durability: CASS test

TABLE 4

| | Embodiment 7-2 | Comparison sample |
|---|---|---|
| Voltage [V] | 21 | 21 |
| Temperature [° C.] | 5 | 5 |
| Electrical current density [A/$dm^2$] | 30 | 3 |
| Processing time [min.] | 3 | 20 |
| Film thickness [μm] | 24 | 22 |
| Hardness [HV] | 820 | 400 |
| Appearance | No microporosity | Slight microporosity |
| Anti-rust test [h] | 2000 | 1200 |
| Luster | Satisfactory | Deterioration |

Remarks)
Film thickness test: JIS-H-8680 Eddy current measurement
Hardness pass/fail: JIS-H-8882 Vickers hardness meter (HV)
Anti-rust test: Alamite JIS-K-5400
Salt-water spray test (white rust)
Hardness alamite: JIS-H-8681
Corrosion durability: CASS test

Ninth Embodiment

Anodic Oxidation

This embodiment uses the apparatus of FIG. 28. An aluminum plate (#2017) with dimensions of 100×100×2 mm is used as the metal (product for processing) piece for anodic oxidation. Titanium lath web electrode plates were installed on both sides of the metal plate facing each other. Insulated vibration-stirring apparatus were also installed on both sides facing each other. The six vibrating vanes made of titanium, have a thickness of 0.4 millimeters and a $D_1$=180 mm and $D_2$=50 millimeters as shown in FIG. 12 (length shown by first peak in FIG. 4). The gap between the titanium lath web electrode plate and the vibrating vane was 60 millimeters. The gap between the titanium lath web electrode plate and the aluminum plate was 100 millimeters.

Electrical power was not supplied via the insulated vibration-stirring apparatus. The vibration motor was driven at 40 Hertz, at a vibrating vane amplitude of 1.5 millimeter and a vibrated at speed/frequency of 2,000 times per minute. The processing liquid was adjusted using sulfuric acid (200 grams per liter) as the chemical to form general-purpose and hard alamite.

The processing results obtained from this embodiment were somewhat inferior to those of the seventh embodiment, however there was no microporosity and a largely uniform alamite was obtained.

The anodic oxidation processing conditions and results obtained are shown below.

(First Results) General-Purpose Alamite
Voltage: 19 volts
Electrical current density: 20 A/dm$^2$
Temperature: 21° C.
Processing time: 3 minutes
Film thickness: 16 μm (Second Results) Hard Alamite
Voltage: 21 volts
Electrical current density: 20 A/dm$^2$
Temperature: 5° C.
Processing time: 3 minutes
Film thickness: 16 μm Tenth Embodiment Anodic Oxidation Processing in this embodiment was performed the same as in the ninth embodiment except that power was supplied via an insulated vibration-stirring apparatus. The number of vibration/frequency of the vibration vanes was 1800 times per minute and the electrical current density was 30 A/dm$^2$.

Results obtained were the largely the same as in the ninth embodiment.

Eleventh Embodiment

Anodic Oxidation of Magnesium

A piece of magnesium alloy AZ91D was utilized as the piece for anodic oxidation (processing product). Processes comprising: preprocessing/alkali immersion washing/washing (alkali anode electrolysis cleaning/washing) acid washing (neutralizing)/washing/acid processing washing/anode processing/washing/dry were performed to obtain the product.

The processing liquid for the acid processing was 85 percent phosphoric acid at 50 grams per liter. The usage temperature was 21° C. The composition of the processing liquid used in the anodic oxidation processing was as follows.

| | |
|---|---|
| potassium hydroxide | 200 grams per liter |
| sodium phosphate | 50 grams per liter |
| aluminum hydroxide | 50 grams per liter |

Anodic oxidation was performed using the apparatus as the eighth embodiment shown in FIG. 21 and FIG. 22.

A material for anodic oxidation the same as the eleventh embodiment was used as the comparison sample and anodic oxidation performed by spark discharge of 250 volts.

Anodic oxidation processing conditions and results obtained are shown in Table 5.

| | Embodiment 11 | Comparison sample |
|---|---|---|
| Voltage [V] | 100 | 250 |
| Electrical current density [A/dm$^2$] | 20 | 2 |
| Processing time [min.] | 3 | 30 |

-continued

| | Embodiment 11 | Comparison sample |
|---|---|---|
| Film thickness [μm] | 25 | 25 |
| Hardness [HV] | 450 | 350 |
| Appearance | No microporosity | Much microporosity |
| Anti-rust test | No abnormalities after 150 hours | Corrosion appeared after 100 hours |

Remarks)
Hardness pass/fail: JIS-H-8882 Vickers hardness meter (HV)
Appearance: Surface was visually inspected by microscope under 500× magnification.
Anti-rust test: JIS-K-5400 Salt-water spray exposure test.

Twelfth Embodiment

Anodic Oxidation of Magnesium

The composition of anodic oxidation processing liquid was as follows.

| | |
|---|---|
| potassium hydroxide | 165 grams per liter |
| potassium fluoride | 35 grams per liter |
| sodium phosphate | 35 grams per liter |
| aluminum hydroxide | 35 grams per liter |
| potassium permanganate | 20 grams per liter |

The processing was performed the same as the eleventh embodiment except for the above processing liquid. Results obtained were the same as the eleventh embodiment.

Thirteenth Embodiment

Electroform Plating

Electroform plating was performed on a circulate plate of SUS steel for an optical disk with a diameter of 200 millimeters and thickness of 2 millimeters using the apparatus described in FIG. 29 through FIG. 30. The insulated vibration-stirring apparatus contained a vibration motor of 200 volts (three-phase)×250 watts. The vibrating vanes were made of titanium, having a thickness of 0.5 millimeters and a $D_1$=250 mm and $D_2$=55 millimeters as shown in FIG. 12 (length shown by fit peak in FIG. 4). A large number of nickel balls with a diameter of 25 millimeters were filled into the titanium web case of the electrode member. The distance between the vibrating vanes and titanium web case was 50 millimeters. The distance between the titanium web case and processing product was 100 millimeters. The vibration motor was driven at 50 Hertz, at a vibrating vane amplitude of 2 millimeters and was vibrated at a speed/frequency of 3,100 times per minute.

A nickel sulfamate bathe was used as the processing liquid and electroforming performed according to the following points.

| (1) Composition of nickel sulfamate bath | |
|---|---|
| Nickel sulfamate crystals | 600 grams per liter |
| Nickel chloride | 5 grams per liter |
| Boric acid | 40 grams per liter |
| Stress adjuster solution (naphthalin trisulfone soda) | 0.5 to 3 milliliters per liter |

-continued

| | | |
|---|---|---|
| Pit inhibitor solution (sodium lauryl sulfate) | 2 to 3 | milliliters per liter. |
| (2) Processing temperature | 50° | C. |
| (3) Processing time | 30 | minutes |
| (4) Electrical current density | 60 | $A/dm^2$ |
| (5) Voltage | 17 | volts |
| (6) pH | 4.5 | |

Electroform plating utilizing an apparatus as described in FIG. 27 and comprising an equivalent vibration-stirring apparatus except without insulation was performed for purposes of comparison.

Processing conditions and the results obtained are shown in Table 6 below.

TABLE 6

| | Thirteenth embodiment | Comparison sample |
|---|---|---|
| Processing time [min.] | 30 | 60 |
| Film thickness [μm] | 300 ± 1 | 300 ± 10 |
| Gas pit defects [%] | 0 | 3 to 5 |

Gas pits are caused by hydrogen gas emitted during electrolysis. This hydrogen gas creates small holes in the electrodeposition surface. These small holes are flaws in the appearance of the plating surface and are the cause of product defects.

Fourteenth Embodiment

Plating

In this embodiment, copper plating (in particular, plating of 50 μm through holes) was performed on 100×100×1.5 millimeter epoxy plastic printed circuit boards (processed product) that were subjected to preprocessing and electrical conduction processing using the plating apparatus described in FIG. 32.

The insulated vibration-stirring apparatus contained a 200 volts (three-phase) vibration motor×150 watts. The five vibrating vanes made of titanium, having a thickness of 0.4 millimeters and a $D_1$=180 mm and $D_2$=50 millimeters as shown in FIG. 12 (length shown by first peak in FIG. 4). Four sets of eight copper-phosphorus balls arrayed vertically and set facing the side were set inside the 250 mm×30 mm diameter titanium web case of the electrode member. The distance between the vibrating vanes and titanium web case was 50 millimeters. The distance between the titanium web case and processed product was 50 millimeters.

The vibration motor was driven at 50 Hertz, at a vibrating vane amplitude/width of 2 millimeters and at a speed/frequency of 3000 times per minute. The plating was performed as described below in the plating tank (725×400×450 mm).

| | | |
|---|---|---|
| (1) Composition of plating liquid | | |
| Sulfuric acid | 190 | grams per liter |
| Copper sulfate pentahydrate | 70 | grams per liter |
| Additive (brightener) | 5 | milliliters per liter |
| (2) Processing conditions | | |
| Plating bath fluid temperature | 25° | C. |
| Electrical current density | 30 | $A/dm^2$ |
| Processing time | 5 | minutes |

Plating utilizing an apparatus as described in FIG. 27 and comprising an equivalent vibration-stirring apparatus except without insulation was performed for purposes of comparison.

Processing conditions and the results obtained are shown in Table 7 below.

TABLE 7

| | Fourteenth embodiment | Comparison sample |
|---|---|---|
| Voltage [V] | 8 | 8 |
| Electrical current density [$A/dm^2$] | 30 | 3 |
| Processing time [min.] | 5 | 50 |
| Film thickness [μm] | 33 ± 1 | 33 ± 3 |
| Hardness [HV] | 400 | 200 |
| Appearance | Luster Satisfactory leveling | Some luster Deteriorated leveling |

Remarks)
Film thickness test: JIS-H-8680 Eddy current measurement
Hardness pass/fail: JIS-H-8882 Vickers hardness meter (HV)

Fifteenth Embodiment

Plating

Copper plating of the printed circuit board was performed using the apparatus (However, the polarity is different from the apparatus shown in FIG. 21.) described in FIG. 21. The insulated vibration-stirring apparatus was the same as the apparatus of the fourteenth embodiment except that it contains electrode support vanes. The dimensions of the electrode support vanes corresponding to $D_1$ of FIG. 12 are the same but the dimensions corresponding to $D_2$ are twice the size of the vibrating vanes. The electrode support vanes were comprised of five vanes.

In all other respects the processing was the same as the fourteenth embodiment. The plating liquid was supplemented as needed.

The plating speed and the finished state was largely the same as the fourteenth embodiment. However the plating for the through-holes was superior to the fourteenth embodiment.

Sixteenth Embodiment

Plating

In this embodiment, processing was performed using a 5 percent pulse power supply with a frequency of 1 kHz and 8 volts of direct current. The plating of the 20 μm through-holes was one step better looking in appearance than the first embodiment. The plating was also uniform and can be applied stably over a long period of time.

The invention configured as described above renders the following effects.

(1) Installing an insulated area on the vibrating rod of the vibration-stirring apparatus or between the vibrating rod and the vibration generating means renders the effect of opening up new fields for utilizing the vibration-stirring apparatus.

(2) Using a heat-insulated area as the insulated area renders the effect that the vibration-stirring apparatus can be used even for agitating high temperature or low temperature processing liquid.

(3) Electricity can be supplied to the vibration-stirring apparatus vibrating vanes and the electrode support vanes that are affixed as needed. So the effect is rendered that the vibration stirring apparatus can possess the functions of at least one electrode for conducting electricity and the function of stirring or agitating for surface treating the product for processing by conducting electricity or conducting electricity to the processing liquid.

(4) When the vibration-stirring apparatus of the present invention is used for surface treatment processing of the product by conducting electricity, electrical shorts do not occur even when the distance between the product for processing and an electrode of opposite polarity is short and electrical current made to flow. Furthermore, bubbles are not emitted from the product for processing or the electrode so the effect is rendered that processing is performed stably and at high speed compared to the conventional art and the efficiency of the surface treatment processing is enormously improved. For example during plating, the electrical current density in the conventional art of 3 A/$dm^2$ can be increased to 20 to 30 A/$dm^2$ in the present invention; an electrical current density of 30 A/$dm^2$ during electroform plating in the conventional art can be increased to 60 $dm^2$ in the present invention; and an electrical current density during anodic oxidation in the conventional art of 3 A/$dm^2$ can be increased to an 30 A/$dm^2$ in the present invention so the effect is rendered that each process is improved.

(5) In particular, when electrode support vanes were added and utilized as electrodes with a polarity opposite that of the product for processing, the tip of the electrode support vane could be installed even closer to the product for processing to render the effect that a larger electrical current density could be used in the processing.

(6) The present invention renders the effect that the surface obtained from surface treatment has excellent characteristics. In particular, the film that is formed has a uniform thickness and excellent film quality characteristics.

(7) When the present invention is utilized for plating, the plating can be performed in a short time compared to conventional methods. Furthermore, the effect is rendered that the metal film thickness can be finely crystallized onto the product for processing so that a uniform, smooth and flat surface without pits can be formed.

(8) When the present invention is utilized for electrodeposition, the effect is rendered that a uniform electrodeposition film coating can be formed with a small differential in film thickness between convex and concave sections, even when coating product with complex, irregular (convex, concave) shapes.

(9) When the present invention is utilized for anodic oxidizing of light metals such as aluminum or magnesium, the effect is rendered that processing time is greatly reduced and productivity is drastically improved. Further, along with enormously improving the hardness of the film, a high quality product with no microporosity can simultaneously be obtained.

What is claimed is:

1. A vibration-stirring apparatus comprising:

a vibration generating means;

a first vibrating rod and second vibrating rod for vibrating while linked to said vibration generating means; and a first vibrating vane and second vibrating vane each installed on both said first and second vibrating rods, wherein a first electrical insulation area is installed on a first link section linking said first vibrating rod with said vibration generating means or on a section of said first vibrating rod nearer the first link section than a section of said first vibrating rod where said first and second vibrating vanes are installed, and a first electrical line is connected to the section of said first vibrating rod where said first and second vibrating vanes are installed, wherein a second electrical insulation area is installed on a second link section linking said second vibrating rod with said vibration generating means or on a section of said second vibrating rod nearer the second link section than a section of said second vibrating rod where said first and second vibrating vanes are installed, and a second electrical line is connected to the section of said second vibrating rod where said first and second vibrating vanes are installed, wherein said first vibrating vane functioning as a first electrode member is electrically connected with said first electrical line by way of said first vibrating rod, while installed on said second vibrating rod via a first insulation member, and wherein said second vibrating vane functioning as a second electrode member is electrically connected with said second electrical line by way of said second vibrating rod, while installed on said first vibrating rod via a second insulation member.

2. A vibration-stirring apparatus according to claim 1, wherein said first and second electrical insulation areas are made of a material comprised mainly of plastic and/or rubber.

3. A vibration-stirring apparatus according to claim 1, further comprising a power supply connected to said first and second electrical lines.

4. A vibration-stirring apparatus according to claim 1, wherein the gap between said first and second electrode members is maintained at 20 to 400 millimeters.

5. A liquid treatment apparatus comprising the vibration-stirring apparatus according to claim 1, and further comprising a treatment tank for holding a processing liquid, and a power supply connected to said first and second electrical lines so as to apply direct current, alternating current or pulsed voltage to said processing liquid via said first and second electrode members.

6. A liquid treatment apparatus according to claim 5, wherein the gap between the first and second electrode members is maintained at 20 to 400 millimeters.

7. A liquid processing method, wherein the processing liquid is charged into said treatment tank of the liquid treatment apparatus according to claim 5, said first and second vibrating vanes are immersed in said processing liquid, and said first and second vibrating vanes are made to vibrate while power is supplied to said processing liquid via said first and second electrode members.

8. A liquid processing method according to claim 7, wherein the gap between said first and second electrode members is maintained at 20 to 400 millimeters.

9. A liquid processing method according to claim 7, wherein said vibration generating means vibrates at a frequency of 10 to 500 Hz, and said first and second vibrating vanes are made to vibrate at an amplitude of 0.1 to 30 millimeters and frequency of 200 to 12,000 times per minute.

* * * * *